(12) United States Patent
Johnson

(10) Patent No.: US 8,983,857 B2
(45) Date of Patent: Mar. 17, 2015

(54) MANAGING OPERATIONAL ACTIVITIES WHEN CONTINGENT PERFORMANCE DELIVERABLES ARE IN PLACE

(75) Inventor: Blake Johnson, Del Mar, CA (US)

(73) Assignee: Blake Johnson, Del Mar, CA (US)

( * ) Notice: Subject to any disclaimer, the term of this patent is extended or adjusted under 35 U.S.C. 154(b) by 1257 days.

(21) Appl. No.: 12/021,213

(22) Filed: Jan. 28, 2008

(65) Prior Publication Data
US 2009/0192841 A1 Jul. 30, 2009

(51) Int. Cl.
*G06Q 10/00* (2012.01)
*G06Q 10/06* (2012.01)

(52) U.S. Cl.
CPC ............ *G06Q 10/06* (2013.01); *G06Q 10/0635* (2013.01)
USPC ........................................................ 705/7.11

(58) Field of Classification Search
USPC ........ 705/7, 16, 21, 59, 71; 380/44, 262, 278, 380/279
See application file for complete search history.

(56) References Cited

U.S. PATENT DOCUMENTS

| | | |
|---|---|---|
| 5,148,365 A | 9/1992 | Dembo |
| 5,768,284 A | 6/1998 | Cox |
| 5,974,395 A | 10/1999 | Bellini et al. |
| 5,983,194 A | 11/1999 | Hogge et al. |
| 6,006,192 A | 12/1999 | Cheng et al. |
| 6,119,149 A | 9/2000 | Notani |
| 6,125,355 A | 9/2000 | Bekaert et al. |
| 6,138,103 A | 10/2000 | Cheng et al. |
| 6,216,956 B1 | 4/2001 | Ehlers et al. |
| 6,332,155 B1 | 12/2001 | Notani |
| 6,397,191 B1 | 5/2002 | Notani et al. |
| 6,493,682 B1 | 12/2002 | Horrigan et al. |
| 6,507,845 B1 | 1/2003 | Cohen et al. |
| 6,516,301 B1 | 2/2003 | Aykin |
| 6,671,673 B1 | 12/2003 | Baseman et al. |
| 6,684,193 B1 | 1/2004 | Chavez et al. |

(Continued)

OTHER PUBLICATIONS

Billington et al., "Supply Chain Strategy: Real Options for Doing Business at Internet Speed", Hewlett-Packard Company, http://billington.ASCET.com, Apr. 2000, vol. 2, pp. 223-226.

(Continued)

*Primary Examiner* — Dante Ravetti
(74) *Attorney, Agent, or Firm* — Kilpatrick Townsend & Stockton LLP

(57) ABSTRACT

When uncertainty is present, operational activities and counterparty relationships related to such operational activities are evaluated and appropriate management actions determined by utilizing data records comprising Contingent Performance Deliverables (CPDs), where a CPD specifies a set of rights and obligations for two or more counterparties to the CPD with respect to operational activities of the counterparties, wherein the rights and obligations are defined over a set of uncertain potential future events (SPFE). Analysis is conducted to assess relevant sources of uncertainty, and to determine appropriate actions under the operational activities, counterparty relationships, and CPD rights and obligations across such sources of uncertainty. After the actions are determined, their impact on the operational activities and counterparty relationships, and on associated performance measures, is determined across the sources of uncertainty. Management of the operational activities and counterparty relationships is improved by utilizing the actions determined and the data generated on the future impact of such actions on operational activities and counterparty relationships subject to uncertainty.

67 Claims, 6 Drawing Sheets

(56) References Cited

U.S. PATENT DOCUMENTS

| | | | |
|---|---|---|---|
| 6,769,013 | B2 | 7/2004 | Frees et al. |
| 7,031,929 | B1 | 4/2006 | Button et al. |
| 7,039,597 | B1 | 5/2006 | Notani et al. |
| 7,134,096 | B2 | 11/2006 | Brathwaite et al. |
| 7,590,937 | B2 | 9/2009 | Jacobus et al. |
| 7,747,339 | B2 | 6/2010 | Jacobus et al. |
| 7,747,500 | B2 | 6/2010 | Hwang et al. |
| 7,752,126 | B2 * | 7/2010 | Wang .............................. 705/38 |
| 2002/0004709 | A1 * | 1/2002 | Peter et al. .................... 702/108 |
| 2002/0059107 | A1 | 5/2002 | Reich et al. |
| 2002/0165816 | A1 | 11/2002 | Barz |
| 2002/0174000 | A1 | 11/2002 | Katz et al. |
| 2003/0014355 | A1 | 1/2003 | Browne et al. |
| 2003/0061126 | A1 | 3/2003 | Erke et al. |
| 2003/0187670 | A1 | 10/2003 | Hassinger et al. |
| 2004/0128261 | A1 | 7/2004 | Olavson et al. |
| 2005/0004858 | A1 | 1/2005 | Foster et al. |
| 2005/0097065 | A1 | 5/2005 | Johnson |
| 2005/0177435 | A1 | 8/2005 | Lidow |
| 2007/0198387 | A1 * | 8/2007 | Uenohara et al. ........... 705/36 R |
| 2007/0233594 | A1 | 10/2007 | Nafeh |

OTHER PUBLICATIONS

U.S. Appl. No. 10/269,794, filed Oct. 11, 2002, Johnson.

Bernstein, C., HP Pilots New E-Procurement Initiatives. EBN, Feb. 26, 2001, 3 pages.

Billington et al., "A Real Options Perspective on Supply Chain Management in High Technology", Journal of Applied Corporate Finance, vol. 15, No. 2, Summer 2002, pp. 32-43.

Bradley University, Black-Scholes—Option Pricing Models, retrieved at URL http://bradley.edu/~arr/bsm/pg01.html, 13 pages.

Cachon, G., "Supply Chain Coordination with Contracts", Chapter 6 of Handbooks in Operations Research and Management Science: Supply Chain Management, Steve Graves and Ton de Kok, editors, North Holland, 2003, 126 pages.

Coy, P., "Exploiting Uncertainty; The "real-options" Revolution in Decision Making", Business Week, New York: Jun. 7, 1999. Issue 3632, pp. 1-5, ProQuest.

Johnson, B., "Conceptual and Methodological Differences in Quantifying and Managing 'Commoditized' and Non-Commoditized Risks", Conference on Integrated Risk Management, Washington University, St. Louis, Missouri, Jun. 9, 2004, 10 pages.

Johnson, B., "Optimizing Tool Availability and Lead Time with Procurement Options", Proceedings of the Thirteenth Annual International Symposium on Semiconductor Manufacturing, San Jose, California, Sep. 2005, 4 pages.

Lucia, J.J., et al. "Electricity Prices and Power Derivatives: Evidence from the Nordic Power Exchange", Finance, Mar. 1, 2000, University of California, Los Angeles, Anderson School of Management, 44 pages total, retrieved at URL http://repositories.cdlib.org/anderson/fin/16_00.

Martinez De Albeniz, V., et al. "Mean-Variance Trade-offs in Supply Contracts", Wiley InterScience, Naval Research Logistics, vol. 53, 2006, pp. 603-616.

Mean Reversion Models, Apr. 19, 2005, pp. 1-8, retrieved at URL http://sphere.rdc.puc-rio.br/marco.ind/revers.html.

Nagali et al., "Procurement Risk Management (PRM) at Hewlett-Packard Company", HP Publication, pp. 1-21.

Patie, P., "On the First Passage Times of Generalized Ornstein-Uhlenbeck Processes", Apr. 2003, pp. 1-18, RiskLab, Switzerland.

Steensma et al., "On the Performance of Technology-Sourcing Partnerships: The Interaction Between Partner Independence and Technology Attributes", The Academy of Management Journal, vol. 43, No. 6, Dec. 2000, pp. 1045-1067, retrieved at URL www.jstor.org/stable/1556334.

Steensma et al., "Organizational Context as a Moderator of Theories on Firm Boundaries for Technology Sourcing", The Academy of Management Journal, vol. 44, No. 2, Apr. 2001, pp. 271-291, retrieved at URL www.jstor.org/stable/3069455.

Vaidyanathan, V., et al. "Using Capacity Options to Better Enable Our Factory Ramps", Intel Technology Journal (Aug. 3, 2005) vol. 9(3):185-191.

Van Dam, C. "Supply Risk and Flexibility Management at Agilent", Parallax View, Jun. 2004, 5 pages.

Leathers, Howard D., "Comparative statics of productions when there are multiple sources of risk." Atlantic Economic Journal, Sep. 1991, 19(3):26.

Weng, Kevin Z., "The power of coordinated decisions for short-life-cycle products in a manufacturing and distribution supply chain." IIE Transactions, Nov. 1999, 31(11):1037.

* cited by examiner

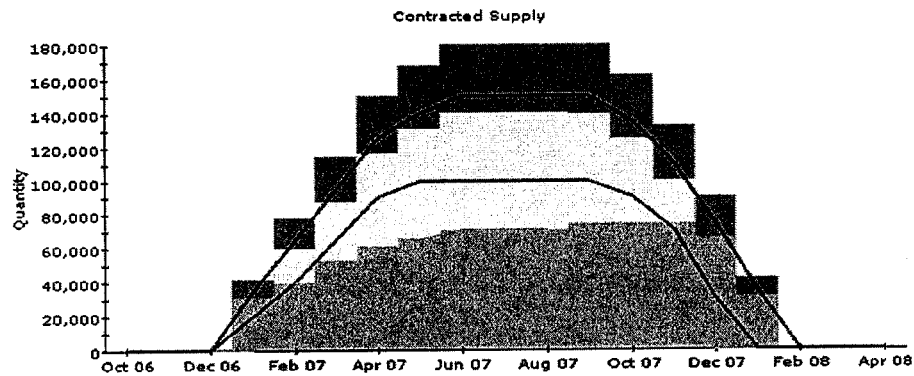

| Sourcing Costs ($NPV) | Low Range (25%) | Mid Range (50%) | High Range (25%) |
|---|---|---|---|
| Material Cost | | | |
|    Material Purchases | 998,489 | 1,384,793 | 1,918,629 |
|    Decrease in Inventory Value | -40,853 | -25,876 | -15,391 |
|    Net Material Cost | 957,637 | 1,358,917 | 1,903,238 |
| Inventory Related Costs | | | |
|    Financing Cost | 16,810 | 11,643 | 8,362 |
|    Storage Cost | 8,325 | 5,711 | 4,079 |
|    Total Inventory Costs | 25,135 | 17,354 | 12,440 |
| Shortage Related Costs | | | |
|    Value of Material Short | 287 | 2,383 | 47,852 |
|    Margin Lost Due to Shortages | 497 | 3,727 | 95,435 |
|    Total Shortage Related Costs | 783 | 6,110 | 143,286 |
| Buyer Penalty | 90,897 | 24,555 | 4,127 |
| Supplier Penalty | 0 | 0 | 0 |
| Other Payments (amortized) | 0 | 0 | 0 |
| Total Sourcing Cost | 1,074,452 | 1,406,937 | 2,063,091 |

| Price ($/unit) | Low Range (25%) | Mid Range (50%) | High Range (25%) |
|---|---|---|---|
| Average Material Purchase Price | 1.76 | 1.78 | 1.78 |
| Average Total Price | 1.98 | 1.83 | 1.90 |

FIG. 4

MANAGING OPERATIONAL ACTIVITIES WHEN CONTINGENT PERFORMANCE DELIVERABLES ARE IN PLACE

CROSS-REFERENCES TO RELATED APPLICATIONS

This application is related to U.S. Application entitled "Coordination And Management Of Operational Activities Subject To Uncertainty" by Blake Johnson, filed concurrently with the present application. The disclosure of the related application is incorporated herein in its entirety.

BACKGROUND

A key challenge in managing operational activities subject to uncertainty, such as manufacturing, procurement, information technology, distribution and logistics, engineering and design, and sales and marketing, is managing the interdependencies between the activities and other related operational activities managed by other organizational entities, both internal and external to the firm, and also subject to uncertainty.

For example, a product line organization within a firm must coordinate its activities with relevant functional teams within the firm, and with external customers and suppliers, creating coordination challenges that are greatly compounded by the impact of multiple sources of uncertainty. The product line organization may learn, for instance, that due to unexpected supply conditions a commodity management team in the firm's procurement organization will not be able to source a sufficient quantity of a required input. As a result, the product line organization may need to re-coordinate with other groups, including commodity management teams responsible for other inputs, internal or external manufacturing partners, relevant sales staff and distribution partners, and one or more customers. Afterward it must revise and re-plan its internal operational activities based on the uncertain outcomes and revisions in plans which result from these interactions.

To facilitate coordination with external partners, in recent years some firms have begun to adopt methods of structuring and managing contractual relationships with external partners. For a general review of research on contracts and relationships in supply chain management, see Cachon, G., "Supply chain coordination with contracts," Handbooks in Operations Research and Management Science: Supply Chain Management. Steve Graves and Ton de Kok, editors, North Holland, 2003. An explanation of how and why firms may choose to use contingent performance commitments in their relationships with other companies can be found in Johnson, B., "Conceptual and Methodological Differences in Quantifying and Managing 'Commoditized' and 'Non-Commoditized Risks'", Conference on Integrated Risk Management, Washington University, St. Louis, Mo., June 2004. Descriptions of activities of early adopters of this approach are provided in Van Dam, C., "Supply risk and flexibility management at Agilent", Parallax View, June 2004, in Vaidyanathan, V., D. Metcalf, and D. Martin, "Using Capacity Options to Better Enable Our Factory Ramps," Intel Technology Journal, Vol. 9, Issue 3, pp. 185-191, and in Johnson, B., "Optimizing Tool Availability and Lead Time with Procurement Options", Proceedings of the Thirteenth Annual International Symposium on Semiconductor Manufacturing, San Jose, Calif., September 2005. Capabilities to support buyers in their structuring and analysis of agreements with suppliers are described in U.S. patent application Ser. No. 10/269,794 "System and method for automated analysis of sourcing agreements and performance" (available via the online Patent Application Information Retrieval (PAIR) system of the U.S. Patent and Trademark Office) and in Martinez de Albeniz, V. and D. Simchi-Levi, "Mean-Variance Trade-offs in Supply Contracts", Naval Research Logistics, Vol. 53, pp. 603-616.

A number of patents exist that describe techniques for facilitating collaboration, both within firms and between firms. Some examples include Button et al., U.S. Pat. No. 7,031,929; Brathwaite et al., U.S. Pat. No. 7,134,096; Notani et al., U.S. Pat. No. 7,039,597; Notani et al., U.S. Pat. No. 6,397,191; Notani et al., U.S. Pat. No. 6,332,155; Notani U.S. Pat. No. 6,119,149; Frees et al., U.S. Pat. No. 6,769,013; Cohen et al., U.S. Pat. No. 6,507,845; Hogge et al., U.S. Pat. No. 5,983,194.

Other patents include Cheng et al., U.S. Pat. No. 6,138,103 which describes a method for production planning in an uncertain demand environment. The method of Cheng et al. incorporates uncertainty in the operational activity of production planning, but does not teach the utilization of structured agreements with counterparties, both internal and external to the firm, to coordinate operational activities with such counterparties, or more specifically the use of Contingent Performance Deliverables for such purpose, as disclosed here.

Firms Break the Overall Management of Their Operational Activities Into Sub-problems Due to scale and complexity of the overall operational activities of the firm, it is standard practice in nearly all firms to (1) break the activities down into subsets, and assign each to a business unit, team, or functional unit (hereafter an "organizational entity") to manage, and (2) establish organizational processes for coordinating and managing operational interdependencies between these subsets of activities and the organizational entities responsible for them. The tasks associated with generating suitable agreements between such organizational entities that set forth the rights and obligations of the parties, and which incorporate relevant sources of uncertainty, can be unwieldy. Further, once such rights and obligations contingent on relevant sources of uncertainty have been established, effective joint management of the operational activities and rights and obligations under such agreements is complex, due to the large number of variables and sources of uncertainty involved, and to the interdependencies between them. The analysis and joint management of such activities would be more effective and convenient if suitable tools and resources were available. Such tools and resources include analytical tools to jointly determine the management actions for the operational activities and the actions under the rights and obligations of counterparty relationships which best achieve management objectives.

The present invention is directed to analytical tools to assess uncertainty related to the operational activities and to counterparty relationships, including counterparty actions under those relationships, and to jointly determine the management actions for the operational activities and for rights and obligations under counterparty relationships subject to uncertainty which best achieve management objectives.

SUMMARY

In accordance with the present invention, when uncertainty is present, operational activities and counterparty relationships related to such operational activities are evaluated and appropriate management actions determined by utilizing data records comprising Contingent Performance Deliverables (CPDs), where a CPD specifies a set of rights and obligations for two or more counterparties to the CPD with respect to operational activities of the counterparties, wherein the rights and obligations are defined over a set of uncertain potential future events (SPFE). Analysis is conducted to assess relevant sources of uncertainty, and to determine appropriate actions under the operational activities, counterparty relationships, and CPD rights and obligations across such sources of uncertainty. After the actions are determined, their impact on the operational activities and counterparty relationships, and on associated performance measures, is determined across the sources of uncertainty. Management of the operational activities and counterparty relationships is improved by utilizing the actions determined and the data generated on the future impact of such actions on operational activities and counterparty relationships subject to uncertainty.

In another aspect, analysis of operational activities with respect to uncertainty data is performed by determining uncertainty data relating to one or more data records, each comprising a contingent performance deliverable (CPD) that specifies a set of rights and obligations for two or more parties to the CPD with respect to operational activities. The rights and obligations are defined over a set of uncertain potential future events (SPFE) of the CPD that produces an evaluation of likely result of the specified rights and obligations of the parties to the CPDs over the SPFEs of the CPDs on the operational activities of at least one organizational entity. The evaluation includes one or more sources of uncertainty related to the operational activities of the at least one organizational entity, or to a party to one or more of the CPDs.

Other features and advantages of the present invention should be apparent from the following description of the preferred embodiments, which illustrate, by way of example, the principles of the invention.

BRIEF DESCRIPTION OF THE DRAWINGS

FIG. 4 is a representation of output produced from the operations illustrated in FIGS. 1-3 following analysis of operational activities when CPDs are in place.

DETAILED DESCRIPTION

Figure 1:
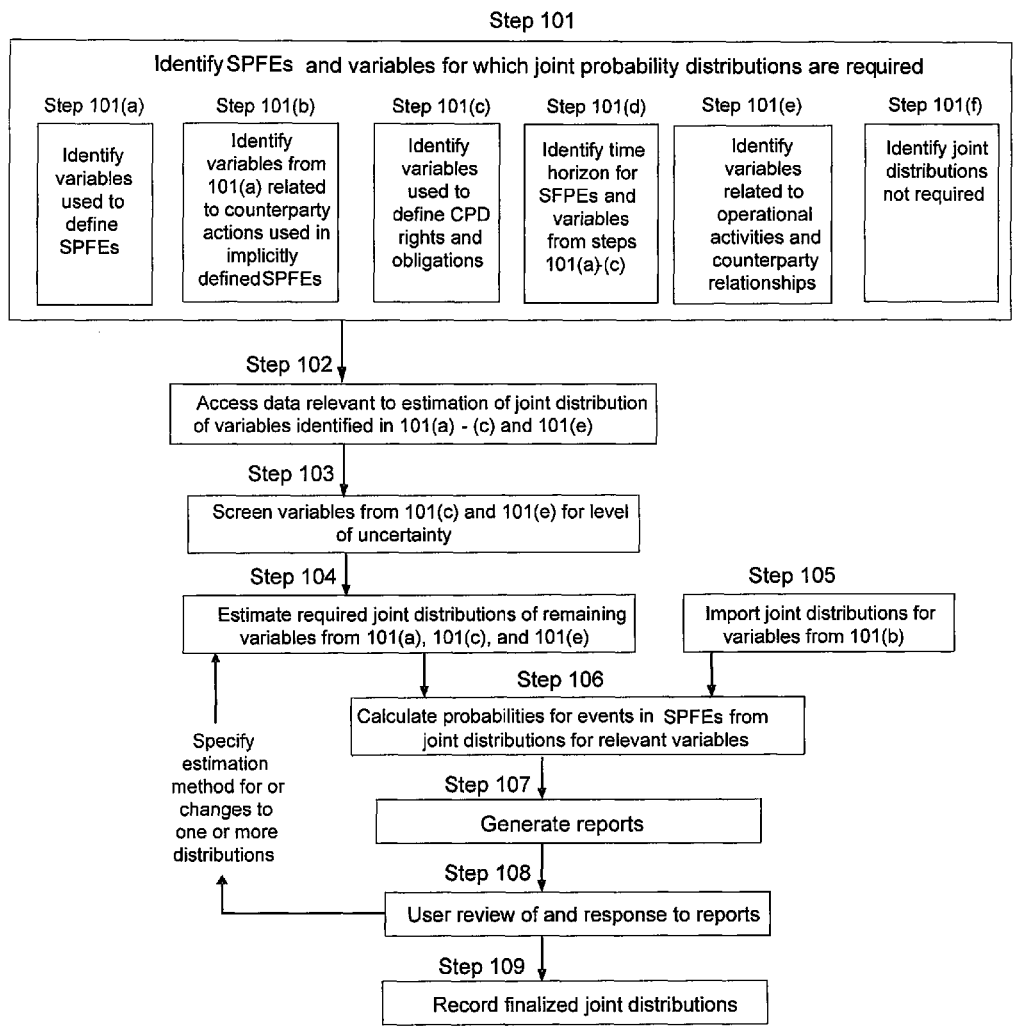
FIGS. 1-3 are flow diagrams of operations performed in accordance with the invention for parties to manage operational activities when Contingent Performance Deliverables (CPDs) are in place.

Effective methods for managing operational activities subject to uncertainty and interdependencies with both internal and external parties are essential to meeting current business requirements. One way to better manage such interdependencies across operational activities subject to uncertainty is through the use of Contingent Performance Deliverables (CPDs) between relevant entities. The present invention is directed to techniques for managing operational activities when CPDs are in place.

Definition of Contingent Performance Deliverable ("CPD")

Definition: A Contingent Performance Deliverable ("CPD") is an agreement governing operational activities between parties over a set of uncertain potential future events (a "SPFE") which specifies at least one right and at least one obligation for each party.

In this discussion, a CPD is a type of data record for a computer system such that the CPD can be associated with data necessary to specify the essential terms of the underlying agreement. That is, a CPD is a data record that exists within the operating environment of a computer system and can be manipulated (e.g. written, stored, and retrieved) by the computer system. The parties to a CPD will also be referred to as the "counterparties" of the CPD and "CPDs" will be used to refer to multiple (two or more) CPD data records.

It is useful to highlight several important distinctions made in the definition of CPDs. First, CPDs address operational activities, and therefore differ from financial arrangements or agreements, including incentive, compensation, and performance management agreements. Second, CPDs specify at least one right and at least one obligation for each party. Third, the rights and obligations of a CPD are specified over a set of uncertain potential future events, or SPFE. The importance and business role of each of these distinctions are described below. First, two representative examples are provided.

CPDs with explicitly defined SPFEs

When the SPFE of a CPD is defined over sources of uncertainty with outcomes that are observable and verifiable by the counterparties of the CPD, the SPFE may be defined explicitly based on the future outcomes of these sources of uncertainty.

For example, consider a manufacturing organization that builds a product sold by a sales organization. Assume that the future price of a key manufacturing input is uncertain, as is the quantity of the product the sales organization will sell during the future period. If the future price paid for the manufacturing input and quantity of the product sold are observable and verifiable by both organizations, potential future values of each can be used to define the SPFE of a CPD. Rights and obligations can then be defined over this SPFE, such as price and quantity terms for the product to be delivered to sales by manufacturing. A simple but representative CPD of this form between the manufacturing and sales organizations is shown in Table 1.

In Table 1 below, the rows of the table relate to customer demand and the columns of the table relate to supply cost. The SPFE with respect to supply cost is divided into sets or intervals comprising less than $1 for the supply cost, greater than or equal to $1 and less than $2 for the cost, and greater than or equal to $2. The SPFE with respect to customer demand is specified as intervals comprising less than 100 units demanded (sold or delivered), greater than or equal to 100 and less than 150 units, greater than or equal to 150 and less than 200, and greater than or equal to 200. The complete SPFE is defined by the pairs of these values, as represented by the cells in Table 1. For example, the cell in the upper right hand corner of Table 1 represents the potential future event that the input price (supply cost) is greater than or equal to $2 and customer demand is less than 100 units.

The CPD of Table 1 specifies rights and obligations of the manufacturing and sales organizations over the SPFE of the CPD. The rights and obligations for a specific event in the SPFE are listed in the cell in the table corresponding to that event. Thus, for a potential future event in which the supply cost is less than $1 and customer demand is between 100 and 150, Table 1 shows that the manufacturing organization agrees to provide finished goods at a price of $7.50 (P=$7.50), and the sales organization agrees to purchase (i.e., ship) between 100 and 150 units ($100 \leq Q < 150$).

TABLE 1

Sample CPD terms

| | | Price of key input | | |
|---|---|---|---|---|
| | | <$1 | $1 < $2 | $2< |
| Customer demand | <100 | P = $7.00<br>Q = 125 | P = $7.75<br>Q = 110 | P = $8.50<br>Q = 100 |
| | 100-150 | P = $7.50<br>100 < Q < 150 | P = $8.25<br>100 < Q < 150 | P = $9.25<br>100 < Q < 150 |
| | 150-200 | P = $7.75<br>150 < Q < 200 | P = $8.75<br>150 < Q < 200 | P = $9.75<br>150 < Q < 200 |
| | 200+ | P = $8.00<br>Q = 200 | P = $9.25<br>Q = 200 | P = $10.50<br>Q = 200 |

Table 1 shows that the SPFE of the CPD may be specified using one or more probability distribution functions. For example, the intervals shown in Table 1 for the price of the key input may be generated from a probability distribution for the key input price. As one example, assume that the range of a probability distribution function for the key input price is from $0.75 to $2.50, and this range has been divided into intervals of less than $1, greater than or equal to $1 and less than $2, and greater than or equal to $2 based on the relatively likelihood of these intervals. These intervals are the column headings in Table 1. A similar approach may be used to generate the intervals for customer demand shown in Table 1 from a probability distribution for customer demand. In this case, the intervals for the key input price and customer demand together define the set of future events that have a possibility of occurring, and probabilities can be calculated for each such event from the joint probability distributions of the key input price and customer demand. As described below, the system supports a variety of different techniques for determining SPFEs in this manner, and for providing data relating to the SPFE values determined, such as their probabilities of occurrence.

Table 1 also shows that the CPD specifies both an input and an output of the operational activities. For example, the operational activities related to the CPD shown in Table 1 involve procurement, manufacturing, and sales. In the case of manufacturing, the output price (price of units=P) is a function of the price of supplies (the key input cost) and number of units demanded by customers of the firm. In the case of sales, rights and obligations concerning the price and number of units to be supplied by manufacturing are a function of customer demand and the key input price. Thus, the CPD specifies rights and obligations of the parties in terms of both inputs and outputs of operational activities to which the CPD relates.

In the more general case a CPD and its SPFE may be specified over multiple time periods and over any number of sources of uncertainty. For example, a CPD might contain Table 1 for an initial time period (e.g., for the next six months) and the same CPD might contain additional tables with similar information, except that the additional tables would contain data for different time periods (e.g., up to one year from now, one to two years, and so forth). In addition, a wide range of different types of rights and obligations may be specified, and more than two counterparties may be involved.

While the relatively simple sample CPD above can be represented in a two dimensional table, more general CPDs with explicitly defined SPFEs can be represented by a list that provides a definition of each event of the SPFE, and for each event specifies additional data fields that define the rights and obligations of each of the counterparties to the CPD under that event.

CPDs with Implicitly Defined SPFEs

In some cases the outcomes of one or more of the sources of uncertainty relevant to a CPD may not be observable and verifiable by all of the counterparties to the CPD. When this is true events in the SPFE that depend on these one or more sources of uncertainty may be defined implicitly, rather than explicitly.

For instance, in the example above the buyer may be either unwilling or unable to disclose the volume of its sales to its customers. As a result, rather than defining relevant events in the SPFE based on these future sales to customers, the events may be defined based on purchases by the sales team under the CPD, subject to the sales team's rights and obligations under the CPD.

For example, the sales team might agree to an obligation to buy at least 100 units of the product in return for a right to buy up to 200 units of the product. The SPFE of the CPD may then include events defined by the number of units of the product the sales team actually chooses to buy during the relevant future period, for example between 100 and 125 units, 126 and 150 units, 151 and 175 units, and 176 and 200 units. Other rights and obligations of both the sales team and the manufacturing organization may then be defined over these potential future events. An example is shown in Table 2 below.

TABLE 2

Sample CPD terms

| | | Price of key input | | |
|---|---|---|---|---|
| | | <$1 | $1 < $2 | $2< |
| Sales team purchases | 100-125 | P = $7.00<br>100 < Q < 125 | P = $7.75<br>100 < Q < 125 | P = $8.50<br>100 < Q < 125 |
| | 125-150 | P = $7.50<br>126 < Q < 150 | P = $8.25<br>126 < Q < 150 | P = $9.25<br>126 < Q < 150 |
| | 150-175 | P = $7.75<br>151 < Q < 175 | P = $8.75<br>151 < Q < 175 | P = $9.75<br>151 < Q < 175 |
| | 175-200 | P = $8.00<br>176 < Q < 200 | P = $9.25<br>176 < Q < 200 | P = $10.50<br>176 < Q < 200 |

Performance to the Terms of CPDs

A wide range of methods may be used to ensure that the counterparties to a CPD honor their rights and obligations under the CPD. Depending on the organizational context and relationship between the counterparties of a CPD, performance may be agreed to verbally and on good faith, as may be appropriate for two organizational entities within the same firm that have a close working relationship. Alternatively, counterparties in different firms that have an adversarial relationship and little trust or faith in the other's behavior may specify penalties or incentives in fully documented and legally binding agreements. Thus one differentiating characteristic of a CPD is its specification of both rights and obligations of its counterparties over its SPFE. Terms added to CPDs to ensure counterparty performance to those rights and obligations function as enablers of these differentiating characteristics.

Benefits of Using CPDs to Coordinate and Manage Operational Activities Subject to Uncertainty Across Organizational Entities within a Firm and with External Partners The rights and obligation of a CPD define, over a set of potential future events (SPFE), what each party to the CPD may:

Request of the other;

Be called upon to deliver to the other;

The rationale for and value of using CPDs to coordinate and manage operational activities across organizational entities is that CPDs provide a minimum sufficient basis for effective management and coordination between entities when uncertainty is present. Specifically, CPDs specify the rights and obligations of each entity over potential outcomes of relevant sources of uncertainty. They do not, however, attempt to specify either the "how" by which each entity plans to meet its obligations under the CPD, or the "why" of how a CPD may align with an entity's goals, resources and capabilities, or other alternatives or obligations.

By defining only the "what" of the relationship between the entities, CPDs facilitate coordination and management of a firm's overall activities by enabling each organizational entity to focus only on managing the subset of the firm's activities it is responsible for. Individual entities do not need to understand or involve themselves in the activities of other entities, including the "how" by which an entity plans to perform to a CPD or the "why" that may lead it to prefer one CPD over another. In addition, because CPDs are defined over a set of potential future events (SPFE), they allow their counterparties to identify, proactively plan for, and manage sources of uncertainty with relevant to their activities, coordination, and performance.

Limitations of Prior Art Related to CPDs and Differentiating Characteristics of the Invention Disclosed Here All of the research and practical examples cited above are limited by the fact that they only address relationships with external companies, and for a given company only address its relationships with one or more suppliers, or with one or more customers. Thus they do not address relationships, and more specifically CPDs, between organizational entities within the same firm, or the simultaneous use of relationships, and more specifically CPDs, for both "inputs" and "outputs", whether with other internal organizational entities or external parties, and in each case subject to uncertainty.

To realize the full potential of structured agreements, and more specifically of CPDs, to improve coordination between supply chain counterparties, a much broader and more complete set of capabilities, including capabilities specific to CPDs, are required. These capabilities can be grouped by their relevance to the following two general requirements:

(1) The Ability to Structure, Execute, and Monitor Appropriate CPDs with Multiple Supply Chain Counterparties for Multiple Products and Services In general, a given set of operational activities will have interactions and interdependencies with the operational activities of multiple counterparties, both internal and external to the firm, involving a range of different products and services. CPDs may be used to improve coordination with each of these counterparties for each of these products or services, requiring the capability to identify appropriate opportunities to utilize CPDs to create value, and to efficiently and effectively structure, execute under, and monitor CPDs to realize such opportunities.

(2) The Ability to Manage Operational Activities when CPDs are in Place

When CPDs are in place with one or more counterparties for products and services relevant to a set of operational activities, the rights and obligations defined by the CPDs must be incorporated into the management of the operational activities. This includes planning and execution of the operational activities, and of management of interactions with both the counterparties to the CPDs and with other relevant counterparties with which CPDs are not in place.

As described above, prior art related to the first set of capabilities is limited to the quite specific and incomplete case in which structured agreements, some of which may meet the definition of a CPD, are used only for inputs (prior art focused on the buyer), or for a single output (prior art focused on the seller), leaving out the important case of utilizing such agreements for both inputs and outputs, including multiple such inputs and outputs. Further, in the prior art the buyer and seller are always separate companies, leaving out the important case of agreement between counterparties that are different organizational entities within the same company.

In view of these limitations of the prior art, new methods are required to enable organizational entities to structure, execute, and monitor relationships with CPDs for (1) both inputs and outputs, including multiple inputs and outputs, (2) with other entities in the same organization, and (3) jointly with both other internal entities and external parties. See, for example, U.S. Patent Application entitled "Coordination and Management of Operational Activities Subject to Uncertainty" to Blake Johnson, which describes systems and methods that provide each of these capabilities.

There is no precedent in the prior art for the second set of capabilities. To highlight the distinction between the second set of capabilities and the most closely related prior art, consider an organizational entity responsible for the manufacture of a firm's products. Assume that the entity has established CPDs for multiple "inputs", with either or both internal teams or external suppliers and partners. Also assume that it has established CPDs for the products it manufactures (multiple "outputs"), with either or both internal entities or external customers.

To effectively manage its operational activities when these multiple CPDs are in place, the manufacturing team must evaluate the terms of each such CPD, including the SPFE of the CPD, the rights and obligations it is granted over the SPFE, and the rights and obligations its one or more counterparties under the CPD are granted over the SPFE. It must then determine how to optimally manage its operational activities to best achieve its business objectives, given these terms of its CPDs. As part of this analysis it must determine how to most effectively utilize its rights and honor its obligations under the CPDs over their respective SPFEs and associated sources of uncertainty, and must also estimate how its counterparties will perform under their rights and obligations under the CPDs, once again across the SPFEs of the CPDs.

Methods exist in the prior art for managing operational activities subject to uncertainty, such as demand or supply uncertainty. See for example U.S. Pat. No. 6,671,673 by Baseman et al. for "Method for Integrated Supply Chain and Financial Management" issued Dec. 30, 2003. However no methods exist for incorporating the rights and obligations specified by CPDs over their SPFEs, for both inputs and outputs, and with both internal and external counterparties, into the management of operational activities. The ability to incorporate such multiple sets of rights and obligations for operational activities defined over multiple sets of uncertain potential future events represents a significant modification and extension of the prior art.

This application discloses methods for managing operational activities subject to uncertainty which provide these capabilities. Specific methods are presented for circumstances where CPDs are in place for both one or more inputs and one or more outputs, and where CPDs are in place with internal counterparties as well as external parties.

Systems and Methods for Managing Operational Activities when CPDs are in Place

The following capabilities enable operational activities subject to uncertainty to be managed when CPDs are in place:

1. Methods to assess the joint probability distribution between the SPFEs of the CPDs, and between the SPFEs and other sources of uncertainty relevant to the operational activities. Other relevant sources of uncertainty may include sources of uncertainty associated with planning and executing the operational activities, and with counterparty actions, including counterparty actions under CPDs and counterparty actions under relationships not managed with CPDs.

2. Methods to assess the likely actions of the one or more counterparties of each CPD, given the counterparty's rights and obligations over the SPFE of the CPD, including determining probability distributions for the actions.

3. Methods to determine the best overall management strategy for the operational activities, including the best actions to take under the rights and obligations of each CPD over the SPFE of the CPD, the best actions for planning and executing the operational activities, and the best actions to take under other counterparty relationships where CPDs, in each case given relevant sources of uncertainty and SPFEs, and given the interdependencies between these actions.

Each of these capabilities is described in more detail below.

A. System and Method to Assess the Joint Probability Distribution between the SPFEs of Relevant CPDs, and between these SPFEs and other Sources of Uncertainty Relevant to the Operational Activity The rights and obligations of each CPD are defined over the set of uncertain potential future events, or SPFE, of the CPD. To appropriately incorporate the rights and obligations defined by relevant CPDs into the management of a set of operational activities subject to uncertainty, it is therefore important to assess (1) the relative likelihood, or probability, of the events in the SPFEs of each individual CPD, (2) the joint probability distribution of the SPFEs of the relevant CPDs, and (3) the joint probability distribution of these SPFEs and the other sources of uncertainty relevant to the management of the operational activities, including those related to the rights and obligations of the CPDs and to counterparty actions.

As an example of the importance of assessing the relative likelihood of the individual events of the SPFE of a CPD, consider a CPD that includes the obligation to provide a large volume of products or services in the event that a counterparty experiences high demand. If the potential high demand is highly probable, it may be most efficient to undertake most of the activities required to meet the prospective demand through advanced planning. In contrast, if the high demand outcome is very unlikely it may be more efficient to create contingent or back-up strategies which can be executed if the uncertain high demand outcome is realized.

As an example of the importance of assessing the joint distribution of the SPFEs of different CPDs, consider an organizational entity that has multiple CPDs in place for the delivery of products, where the products require use of one or more common inputs or internal resources of the organizational entity. Under these circumstances, to appropriately plan its overall activities the entity must assess the joint probability distribution of demand for the relevant products across the SPFEs of the CPDs for their delivery. For example, if the counterparties of two of the CPDs serve competing end markets, one counterparty may be more likely to experience high demand when the other experiences low demand, and vice versa. In contrast, if the counterparties serve complementary end markets, if one experiences high demand the other may be more likely to also experience high demand. After the joint probability distribution of future demand under the CPDs has been assessed, the organizational entity can use the joint probability distribution of demand for its products to determine the probability distribution of its requirements for the common inputs or internal resources which it will require to produce the products.

As an example of the importance of assessing the joint distribution of SPFEs and other sources of uncertainty relevant to the management of the operational activities, consider an organizational entity with internal resources which exhibit uncertain levels of productivity, for example manufacturing yield. Assume that analysis of the productivity of the internal resources has shown that while uncertain, the productivity is generally lower when the organizational entity's delivery level is high, due to the increased demands which the high delivery level places on the resources. To appropriately plan and manage the internal resources given this relationship, the organization may assess the joint distribution between the uncertainty productivity of the resources and the uncertain delivery levels required across the SPFEs of relevant CPDs.

Assessment of the joint probability distribution between SPFEs and sources of uncertainty which impact counterparty relationships which are not managed with CPDs is valuable for similar reasons. In the example above, for instance, one or more inputs may be secured from counterparties under relationships not managed with CPDs, and their availability may be subject to uncertain supply lead times or quantity constraints under these relationships. To ensure sufficient supply is available to meet the uncertain delivery requirements across the SPFEs of relevant CPDs, the organizational entity may accordingly benefit by assessing the joint probability distribution between the SPFEs and the uncertain supply lead times or quantity constraints. For example, if the supply risks are positively correlated with potential future events under which product delivery requirements are high, actions to manage the supply risks will be more important than if the risks are negatively correlated with the level of future product delivery requirements.

In all of the above cases, further benefits can be realized by updating relevant probability distributions as new information arrives over time. In addition, in cases where the joint distribution of two or more variables is assessed, information received about one or more of the variables can be used to update the probability distributions for other variables utilizing the joint distribution.

As is standard in practice, a wide range of statistical techniques, as well as techniques for extracting probability estimates from experts, and for estimating probabilities through simulation and analytic modeling, can be employed to estimate the necessary probability distributions.

FIG. 1 shows a flowchart of operations performed by a computer system constructed in accordance with the present invention for assessing the probability distributions of the SPFEs of relevant CPDs, the joint distributions between these SPFEs, and the joint distributions between these SPFEs and other sources of uncertainty relevant to the operational activities, including those related to rights and obligations of the CPDs.

In operation 101 of FIG. 1, the SPFEs and uncertain variables for which probability distributions and joint probability distributions are to be estimated are identified. The time intervals over which the probability distributions are required are also identified. These may include the time to maturity of the relevant CPDs, the time interval over which probability information about an uncertain variable is required, and/or the time horizon for the analysis in which the probability distributions will be used in. Details about the source and nature of each of these types data are provided below.

Information About Uncertain Variables Related to SPFEs, and to Rights and Obligations of CPDs In the most common instance, information about the SPFEs and rights and obligations of CPDs will be extracted from a CPD data storage location. The CPD data storage location includes all CPD terms, including SPFEs, rights and obligations, and the time horizon over which they are defined. All such information may be extracted. In step 101(a) the variables used to define the SPFEs of each relevant CPD over its remaining time horizon are recorded. In step 101(b) variables related to counterparty actions used in the definition of implicitly defined SPFEs are identified from the set of variables identified in step 101(a) and recorded for analysis in step 105 below.

In step 101(c) the variables used to define to the rights and obligations of each relevant CPD over its remaining time horizon are recorded. Because some or all of the variables used to define the rights and obligations may not be subject to uncertainty, or may not be subject to sufficient uncertainty to merit probabilistic modeling, such variables identified may be screened for level of uncertainty, as described below. In step 101(d) the time horizons for the variables identified in steps 101(a)-(c) are extracted from the definitions of the SPFEs and the rights and obligations.

Information About Other Uncertain Variables

Figure 3:
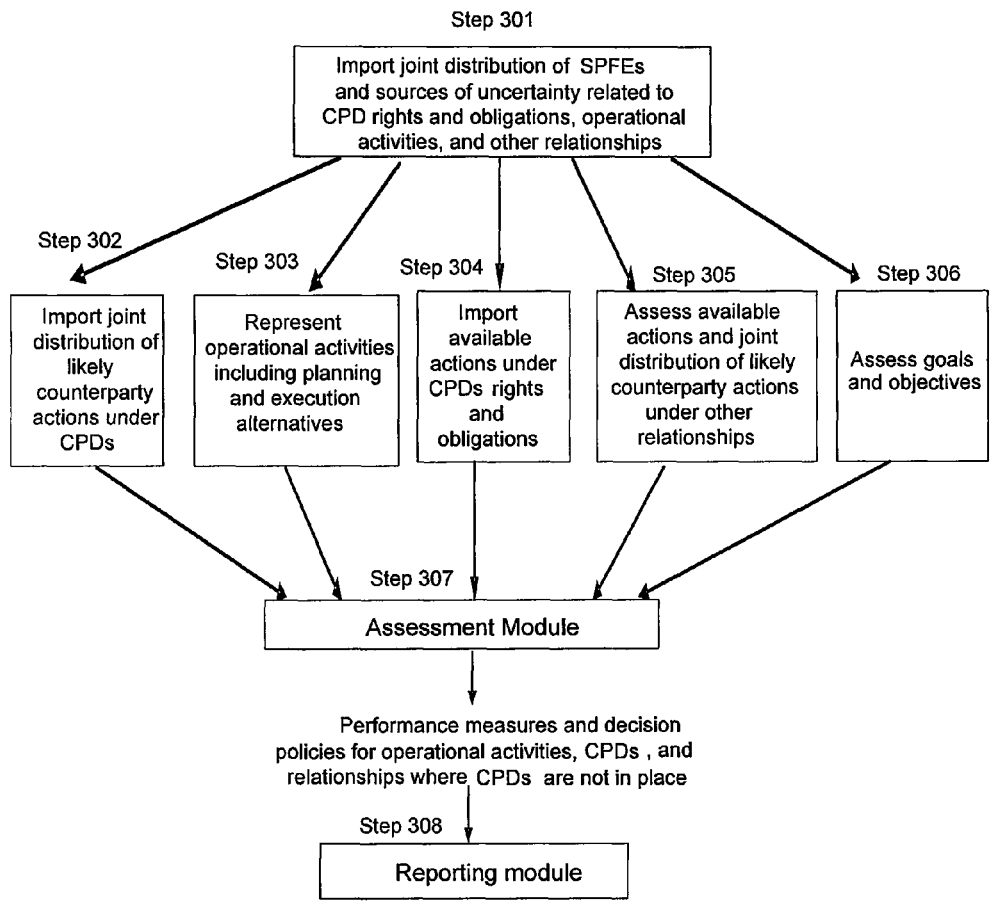

In the most common instance, the identity of uncertain variables, other than the variables used in the definition of the SPFEs and/or in definition of the rights and obligations of CPDs as identified above, will be extracted from the data storage location of the analysis system in which the probability distributions generated by the present system are to be utilized. An example of such as system is shown in FIG. 3 and described in Section C below. Such an analysis system contains the description of relevant operational activities, counterparty relationships, and CPDs, and associated time horizons. In step 101(e) variables related to the operational activities and counterparty relationships are extracted, along with relevant time horizons. Because some or all such variables may not be uncertain, or not sufficiently uncertain to merit probabilistic modeling, the variables identified may be screened for level of uncertainty, as described below.

If available in the analysis system data storage location, in step 101(f) data about one or more of the joint distributions required by the analysis system may also be extracted. As an example of such data, under the structure or assumptions of the analysis system certain variables may be unrelated or statistically independent. Based on this analysis system data, in step 101(f) data may be recorded noting that the estimation of the joint distribution of such variables is unnecessary. In a second example, similar information about the structure or assumptions of the analysis system may show that joint distributions are only required between certain subsets of variables, rather than between all variables. For example, a manufacturing organization may supply a product to multiple internal and/or external customers, each of which may have uncertain demand. However, to appropriately plan its production with the analysis system, the organization only requires knowledge of the probability distribution of the aggregate demand for the product across such customers. Based on this information, in steps 101(f) data may be recorded noting that the joint distribution between the demand of each customer and sources of uncertainty related to production, for example manufacturing yield or the availability of necessary inputs, need not be estimated, and that only the joint distribution between such sources of uncertainty related to production and aggregate customer demand is required.

In an alternate configuration of the system, some or all of the information extracted in steps 101(a)-(f) above may be extracted from other data storage locations where the data fields described are stored, and/or may be provided by the user through a suitable user interface, data upload, or alternative means.

In step 102 data relevant to estimation of the probability distributions and required joint probability distributions of the variables identified in module 101 is accessed. Such data may include historical data about the variables, projections of their future values, the outputs of modeling and analysis of the variables, and other data and analysis relevant to estimating the required probability distributions and joint probability distributions. Such data may be accessed from whatever data storage location it is maintained, for example enterprise data storage locations, the data storage location for the analysis system described in Section 3 below, user spreadsheets or databases, etc.

In step 103 the degree of uncertainty of variables identified in steps 101(c) and 101(e) is analyzed. The user may specify one or more criteria for the nature and extent of uncertainty demonstrated by such variables in relevant historical data, forecasted values, or other relevant data from step 102, in order to merit inclusion in the set of variables for which probability distributions and required joint probability distributions are to be generated by the system. Variables which fail to meet specified criteria are removed from the set of variables identified in module 101.

In step 104 the data from step 102 is analyzed and used to estimate the required probability distributions and joint probability distributions for the variables remaining from module 101 following screening for level of uncertainty in step 103. Any of a range of statistical or probabilistic analysis and modeling methods commonly used in the art may be utilized for the estimation of such probability distributions and joint probability distributions. In particular, in the event that the data available for one or more such estimations is limited, and such limitation impacts the statistical validity or quality of the estimations, a range of statistical and probabilistic techniques appropriate for such circumstances may be employed. These include grouping the variables into sets of variables believed to share common characteristics, and/or utilizing data about other related variables believed to share similar characteristics. After suitable normalization of such related data inputs, estimates may then be based on this larger data set.

Once the probability distributions and joint distributions have been estimated they are stored in the probability distribution storage location, as shown in FIG. 1.

In step 105 the required probability distributions and joint probability distributions for the variables identified in step 101(b), which are uncertain variables whose values are defined by counterparty actions, are sourced from the system described in Section B below and shown in FIG. 2, or another comparable system.

In step 106 probabilities for the events which make up each SPFE are calculated from the probability distributions and joint probability distributions estimated in steps 104 and 105. Any of a range of established statistical or probabilistic analysis methods may be utilized. Once the probabilities are calculated they may be stored in the CPD data storage location, the probability distribution storage location, or another suitable location.

In step 107 user reports may be generated summarizing and/or comparing the probability distributions and joint probability distributions which have been estimated, and/or the probabilities determined for the SPFEs. Data may be presented in graphical format, data tables, spreadsheets, or other suitable formats. A wide range of statistical and probabilistic data may be presented, including values such as the mean, variance, percentile values, extreme values, and relationships between variables, in each case for distributions at individual points in time, and for cumulative and conditional distributions over time. Measures of error, statistical validity, and other methods of assessing the quality of the estimates may be presented, and the performance of different methods for generating such estimates may be compared for user review and selection.

In step 108 users review the reports generated in step 107, and may provide suitable modification and response. For example, if the performance of multiple alternative methods for generating one or more of the probability distributions is shown in the reports, the user may specify the method which should be utilized. As a second example, the user may specify changes to one or more of the probability distributions based on expert judgment or other data sources. For example, the user may be aware that a particular probability distribution should be subject to a minimum or maximum bound due to a capacity constraint of a related manufacturing process or transportation system, etc. After suitable user review and modification, if any, in step 109 the finalized probability distributions and joint probability distributions are recorded in the appropriate data storage location, as specified in step 106.

B. System and Method to Assess the Likely Behavior of a Counterparty of a CPD over the SPFE of the CPD Because CPDs specify both rights and obligations for each of their counterparties over their SPFEs, the specific future actions of a counterparty under one or more of the potential future events of the SPFE may be uncertain, due to uncertainty about how that counterparty will exercise its rights under such events, or perform to its obligations. As a result, to manage operational activities when CPDs are in place, it is useful to assess how each CPD counterparty is likely to utilize its rights and perform under its obligations over the SPFE of the CPD, including determining probability values for potential actions.

For example, under a CPD a counterparty may commit to take delivery of at least a minimum quantity of a product or service, but also be given the right to request additional quantity of the product or service up to some maximum quantity, where both the minimum and maximum quantities have been selected in relation to the range of the counterparty's potential future demand. Modeling and analysis may be conducted to assess the probability distribution of the quantity the counterparty will actually request between the minimum and maximum of the range for the relevant events from the SPFE, and the likelihood that it will fail to honor its obligation to take at least the minimum quantity. In order to effectively model the counterparty's likely future quantity, the analysis may incorporate factors including the specific terms of the rights and obligations, and the counterparty's circumstances, objectives, requirements, constraints, and other alternatives, all of which may influence its actions.

For example, available information about the level and variability of the counterparty's past demand may reveal that outcomes near the high end of the ranges specified by the rights of the CPD are more likely. However, additional information about the counterparty's current inventory or its recent demand may enable this assessment to be further refined or updated. Similarly, information about the counterparty's business, for example that it will utilize the product or service addressed by the CPD in a critical, high margin, high variability business activity, or in contrast in a less important, low margin activity, may imply different behavior, for example higher purchases to ensure a high availability level in the first case, or lower purchases to minimize inventory and potential liability, and possible risk that it will fail to take at least the minimum specified quantity in the second case.

Finally, terms of the CPD rights and obligations may provide additional insights. For example, if the counterparty is exposed to penalties or incentives related to its performance under its rights and obligations, the nature and magnitude of such penalties and incentives is likely to affect its behavior.

It is important to note that the extent of information available to conduct analysis of this kind will in general differ substantially when a counterparty to a CPD is another entity within the same firm, versus when it is an external entity. For example, a counterparty within the same firm may be willing to share extensive information about its objectives, resources, and current activities, or may even be willing to provide its own best assessment of its likely future actions across the SPFE of a CPD. In contrast, an external firm may choose to keep some or all such information proprietary in order to improve its negotiating position, or due to confidentiality restrictions.

In many cases it may also be useful to jointly analyze likely counterparty behavior across two or more CPDs. For example, multiple CPDs may be in place with the same counterparty for the same product or service, or for related products or services. In such cases more accurate assessments of the counterparty's performance under each CPD can in general be made if the counterparty's likely utilization of the combined set of CPDs is analyzed jointly. For example, two or more CPDs may provide access to flexible quantities of the same product or service, but at different lead times or prices. When this is the case the counterparty will in general wish to jointly optimize its utilization of the CPDs to best meet its overall business needs, based on factors such as the lead time at which it learns more about its future requirements for the product or service in question, and the importance it assigns to the price differential between the CPDs. As a second example, two or more CPDs for substitutable products or services may be in place with the same counterparty, making it likely that if the counterparty chooses to utilize a significant quantity of one it will be less likely to utilize a significant quantity of the other, and vice versa.

For similar reasons it may be useful to jointly analyze the likely behavior of two or more different counterparties if their behavior under one or more CPDs may be related. For example, if the counterparties are exposed to similar sources of business uncertainty, this shared risk may lead to similar behavior under relevant CPDs. Examples include suppliers exposed to similar capacity, technology, lead time, or cost-related risk exposures, or customers exposed to similar market demand uncertainty. As a second example, different counterparties may need to coordinate their activities, either directly or indirectly. For example, one or more material suppliers and one or more manufacturers which each must contribute to the delivery of a specific product will have directly related demand requirements.

It is important to note the relationship between (1) the capabilities described in this section for assessing the likely behavior of CPD counterparties under their rights and obligations across the SPFEs of their CPDs, and (2) the capabilities described above for assessing the probability distributions and joint probability distributions of SPFEs, and of other relevant sources of uncertainty. Specifically, the later capabilities are used to assess relevant sources of uncertainty, including the SPFEs of CPDs, and sources of uncertainty relevant to the operational activities in question, including sources of uncertainty related to counterparty actions. In contrast, the capabilities described here provide means for determining a counterparty's likely actions under its rights and obligations of a CPD, including uncertainty about and probability distributions for how counterparties may utilize their rights and perform under their obligations.

In all of the above cases, further benefits can be realized by updating assessments of likely counterparty actions based on the arrival of new information over time, including information about counterparty circumstances, objectives, requirements, constraints, and other alternatives, about their current or previous actions under CPDs, and about relevant sources of uncertainty.

A wide range of modeling methods can be used to assess likely counterparty actions, including models of the counterparty's operational activities, and of their general business activities. The methods described in the next section may also be applied to one or more CPD counterparties, and used to assess their likely actions under one or more relevant CPDs.

Figure 2:
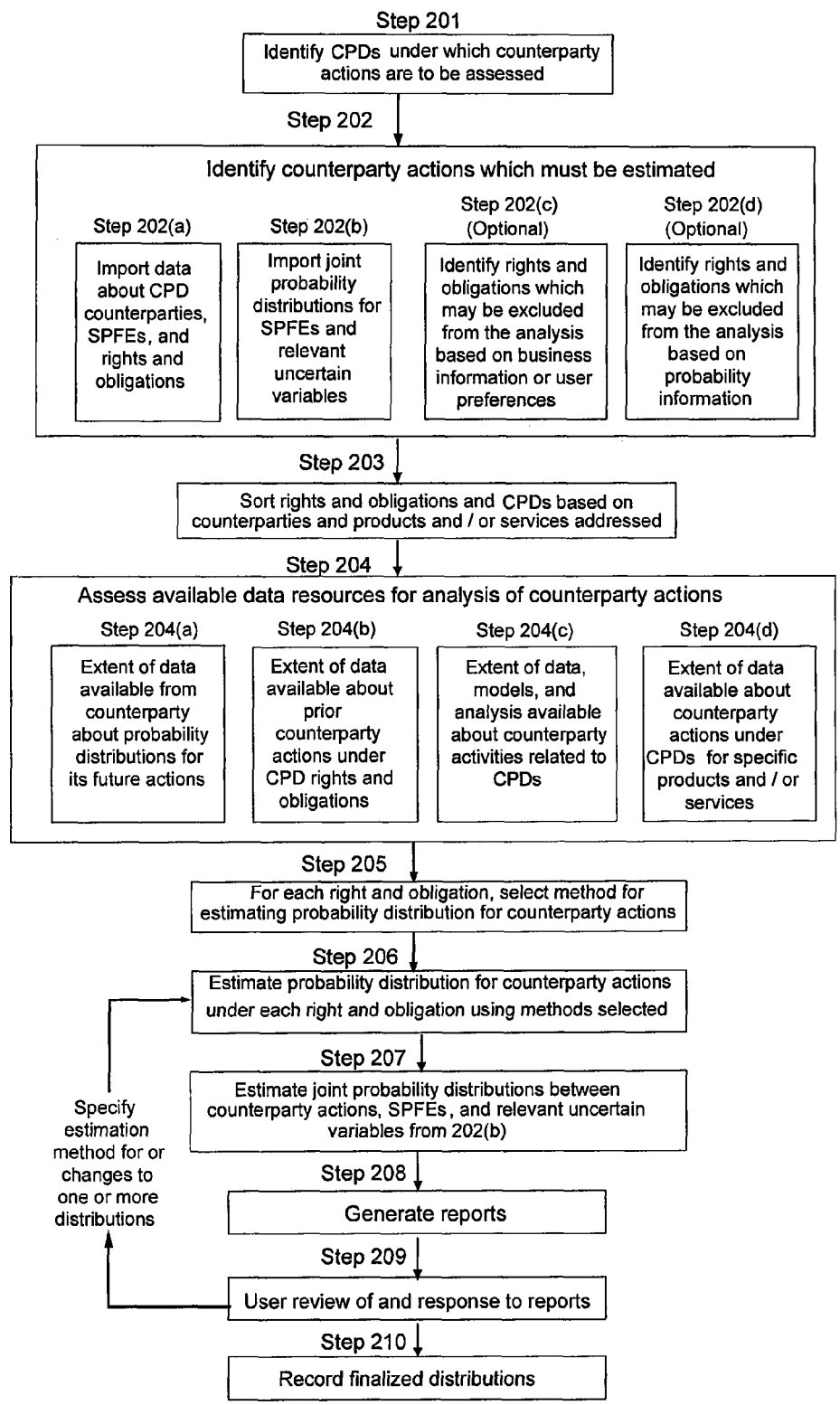

FIG. 2 shows a flowchart of operations performed by a computer system constructed in accordance with the present invention for determining likely counterparty actions under CPDs, including probability values for such potential actions.

In the first operation 201 of FIG. 2, the CPDs under which counterparty actions are to be assessed are identified. In the most common instance this information will be stored in the CPD data storage location for the relevant organizational entity. It may also be stored in the data storage location for the analysis assessment component described in Section 3 below and shown in FIG. 3, or another similar component.

In step 202 the counterparty actions which must be estimated for the CPDs identified in step 201 are determined. The operation comprises steps 202(*a*) and 202(*b*), and optional steps 202(*c*) and 202(*d*).

In step 202(*a*) information about the CPDs is extracted from the CPD data storage location, including data about CPD counterparties, products and/or services addressed, SPFEs, rights and obligations, and time horizons.

In step 202(*b*) information about the probability and joint probability distributions of the SPFEs of the CPDs, related uncertain variables, and uncertain variables related to the counterparties, as determined by the system described in Section A above and shown in FIG. 1, is extracted from the data storage location of that system.

In optional step 202(*c*) information about CPD rights and obligations over the SPFE of the CPD are analyzed to determine counterparty rights subject to uncertain utilization, and obligations subject to performance risk. In general, all rights convey flexibility and all obligations are subject to performance risk, and therefore all rights and obligations will be candidates for analysis. However, relevant terms and conditions may make such actions economically undesirable, e.g. CPDs may have been structured to include penalties for non-performance which are greater than the benefits of non-performance. Rights and obligations that meet such criteria are identified here. Further, users may also specify criteria for excluding rights and obligations, or categories thereof, from the analysis, for example based on user knowledge and expectations about counterparty behavior under the rights and obligations, or based on user preferences.

In optional step 202(*d*) information about the rights and obligations identified in step 202(*c*) is combined with information about the probability and joint probability distributions of relevant SPFEs and of other uncertain variables to determine if any of the rights and obligations identified in step 202(*c*) may not need to be analyzed due to the probabilities of the uncertain events to which they pertain. For example, a right to buy additional units of a product may be irrelevant, and accordingly excluded from the analysis, if the probability that the additional units will be required is zero, or sufficiently small.

In step 203 the rights and obligations identified in step 202, and the CPDs to which they pertain, are sorted based on CPD counterparty and by the one or more products or services they address.

In step 204, available data resources for the analysis of counterparty actions are assessed for each of the counterparties and products and services identified in step 203. The module is comprised of steps 204(*a*)-(*d*), each of which is described below.

In step 204(*a*) the relationship with each counterparty identified in step 203 is assessed to determine whether the counterparty currently provides, or may be able to provide, information about the probability distributions of its future actions under its CPD rights and obligations. For example, counterparties in the same organization may be willing to provide such information, while external counterparties may view such information as confidential or strategic. Further, not all counterparties may have such information, since they may lack a system, such as the system described in Section 3 below and shown in FIG. 3, which may be used to derive it. Counterparties that are either unwilling or unable to provide probability distributions for their future actions, may, however, be currently providing, or willing to provide, forecasts or other information relevant to the estimation of such probability distributions. In the most common instance, the forms of data described in enterprise relationship management and counterparty collaboration systems which identify data sources received from counterparties may be assessed.

In step 204(*b*) the extent of data available about prior counterparty actions under CPD rights and obligations is assessed. For example, one counterparty may have a long history of many CPD relationships with the organizational entity, represented in data which can be analyzed to determine the counterparty's typical actions under CPD rights and obligations, while another counterparty may have no prior history of CPD relationships with the organizational entity. In the most common instance, data about prior counterparty actions under CPD rights and obligations can be found in the CPD data storage location and/or in enterprise data storage locations where counterparty transactions are recorded.

In step 204(*c*) the extent of available data, models, and analysis about counterparty business activities related to the operational activities addressed by the one or more CPDs in place with the counterparty are assessed. For example, if the counterparty is another organizational entity within the same firm, or an external party with which a close working relationship is maintained, significant information and analysis related to the counterparty's activities, circumstances, objectives, and other counterparty relationships may be available for use in estimating its likely actions under its CPD rights and obligations. In the most common instance, such data can be found in storage locations for enterprise data concerning counterparty relationships, such as customer relationship management applications, or in files such as spreadsheets and databases maintained by members of the organizational entity who interact with the counterparty.

In step 204(*d*) the extent of information about prior counterparty actions under CPDs for specific products and/or services, or categories thereof, is assessed. Rather than focusing on specific counterparties, the focus is thus on data about counterparty performance under CPDs for particular products or services, or categories thereof, across all counterparties for such products or services. Such data may be used to assess patterns in behavior under CPD rights and obligations for the product or service across counterparties, and to assess the level of consistency in such behavior across counterparties.

For example, characteristics of the product or service, or sources of uncertainty related to the product or service, may be the main drivers of counterparty performance under CPD rights and obligations for the product or service, rather than the goals, circumstances, or business practices of particular counterparties. As a second example, an organizational entity may utilize CPDs for a product or service with several different counterparties over time, generating little history with individual CPD counterparties, but significant history across counterparties.

In the most common instance, such data can be found in the same data locations identified in step 204(*b*), i.e. the CPD data storage location and/or enterprise data storage locations where counterparty transactions are recorded.

In step 205 methods for estimating counterparty actions for each of the rights and obligations identified in module 202 are selected based on data gathered in module 204 and/or user-specified criteria.

For example, users may specify that they prefer to rely on performance projections generated by counterparties from step 204(*a*), if such projections include the distribution of such actions across relevant sources of uncertainty. If such projections are not available, the user may specify criteria for determining whether estimates should be based on data about the prior actions of specific counterparties from 204(*b*), data, models, and analysis about counterparty business activities from step 204(*c*), data about performance under CPDs for specific products or services from step 204(*d*), or combinations thereof.

Any and all such user-specified criteria may be made specific to one or more categories of the counterparties and/or products and services identified in step 203. For example, the user may specify one set of criteria for counterparties which meet user-defined criteria, such as internal counterparties or counterparties with which large numbers of CPDs are in place, and another set of criteria for all other counterparties. As a second example, users may specify one set of criteria for commodity products or services, where counterparty behavior is expected to be influenced by overall market conditions, such as market price and availability, and another set of criteria for unique or specialized products or services where counterparty behavior is expected to be influenced primarily by relationship-specific factors.

As a third example users may specify criteria for specific types of rights or obligations. For example, a user may specify that counterparty rights to buy or sell a commodity product whose price is subject to market-based fluctuations should be analyzed based on the probability distribution of the difference between the uncertain future market price and the price specified under the right by the CPD (which may also be uncertain).

In step 206 the probability distribution for future counterparty actions under each right and obligation identified in step 202 is determined utilizing the method selected for estimating such actions in step 205, and relevant data from modules 202 and 204. A wide range of methods for completing such calculations are available in the art. Three representative categories of methods are summarized briefly below.

Before describing the categories of methods it is important to note that the outputs of all methods are probability distributions which represent the nature and extent of the uncertainty about the counterparty's actions. Also note that such probability distributions must be generated for relevant rights and obligations under each event from a CPD's SPFE, since counterparty actions will in general be influenced by, and therefore differ across, each such event. Finally, any method of representing a probability distribution may be used, including continuous and discrete probability distributions, stochastic processes, scenarios, etc.

While in general counterparty behavior under each right and obligation of a CPD must be analyzed, in many cases it may be more efficient and/or more effective to analyze multiple related rights and obligations jointly, due to the presence of interdependencies or interrelationships between them. For example, rights and obligations related to the price and quantity of a product or service may be analyzed jointly if both are affected by common factors, such as limited availability of an input required to produce the product. Similarly, it may be useful to jointly analyze similar rights and obligations granted over multiple events of an SPFE, including similar events defined at multiple points in time. Finally, it may also be useful to jointly analyze the rights and obligations of two or more counterparties related to a specific product or service. For example, each may be materially impacted by one or more common sources of uncertainty or other explanatory variables, e.g. the availability of the key manufacturing input in the example above, or common business practices across a set of counterparties for a product or service.

Methods Based Primarily on Information About a Counterparty's Future Actions which is Provided by the Counterparty When information is provided by a CPD counterparty about its likely future actions under one or more CPD rights and obligations, this information may utilized directly, or may be further modified or processed before use.

For example, if a CPD counterparty provides one or more probability distributions for its future actions, and the probability distributions are believed to be accurate and unbiased, they may be utilized directly. Alternatively, if the probability distributions may be subject to bias or inaccuracies, analysis of such potential bias or inaccuracies may be conducted, and if identified the probability distributions may be suitably modified based on the results of the analysis. For example, data about the past performance of the relevant counterparty from step 204(*b*) may be analyzed to assess its consistency with the probability distributions for its future actions which a counterparty has provided, and any discrepancies identified and corrected. As one example, the counterparty may project a higher probability of taking actions toward the maximum end of its set of feasible actions under a right, but in the past may actually have taken actions toward the minimum end of its feasible set of actions in the majority of instances.

If the information provided by the counterparty does not include a full probability distribution for its future actions, additional analysis of other relevant data, including data from steps 202(*b*) and 204(*b*)-(*d*) may be utilized to generate the required probability distributions. For example, if a counterparty provides information about its expected future actions, suitable probability distributions for its potential actions around these expected actions may be generated based on analysis of data about relevant sources of uncertainty (from step 202(*b*)), variability of the counterparty's actions under previous CPDs (using data from 204(*b*)), variability of the actions of other counterparties for the same or related products or services (using data from 204(*d*)), or modeling and analysis of the counterparty's likely actions (using data, models, and analysis from 204(*c*)).

Methods Based Primarily on Information About Prior Counterparty Performance under CPD Rights and Obligations Analysis of historical data about previous counterparty actions, including analysis of the variability and other measures of the distribution of such actions, and of patterns in or explanatory factors for such actions, may be used to construct the required estimates of the probability distributions for future counterparty actions. In many cases such analysis will utilize information about the probability distributions and joint probability distributions of related variables and SPFEs from step 202(b).

For example, data about the counterparty's actions under previous CPDs from step 204(b) may be analyzed to determine the historical variability of the counterparty's actions across the feasible ranges for its actions under rights similar to the rights being analyzed, or to analyze its actions under similar obligations. Similar analysis may be conducted using data from step 204(d) about the actions of other counterparties under CPDs for the products or services being analyzed. Alternatively, data from steps 204(b) and 204(d) may be combined so that all available historical data, including data about both the relevant counterparty and the relevant product(s) or service(s) in question, may be utilized. In all such cases data about the probability distributions and joint probability distributions of relevant variables and SPFEs from step 202(b) may be used as additional explanatory variables. As an example, analysis of the joint distribution between relevant counterparty actions and related sources of uncertainty may reveal that most or all manufacturers of a product fail to perform to CPD product delivery obligations when a key manufacturing input is unavailable, or fail to perform to CPD product pricing obligations when the market price for the product is unusually high.

Methods Based Primarily on Modeling and Analysis of Counterparty Operational Activities, Including Objectives, Circumstances, and Activities Models and analysis of a counterparty's operational activities related to its areas of action under a CPD may be used estimate is future actions under the CPDs rights and obligations. Such models may incorporate counterparty objectives, circumstances, activities, other counterparty relationships related to the operational activities, and to its actions under CPD rights and obligations. The models and analysis developed may range from very simple representations of one or more relevant counterparty decisions to complete models of a counterparty's activities and relationships.

As an example of a simple model, a counterparty's decision to honor its obligation under a CPD to deliver a product or service at a fixed price may be modeled as a function of the uncertain future market price for the product or service. For example, if the market price is above the fixed price specified by the CPD plus any non-performance penalties also specified by the CPD, the counterparty may choose not to perform under its obligation, but when the market price is below this level it may choose to perform to the obligation. As an example of a more complete model, a system of the kind described in Section C below and shown in FIG. 3 may be utilized to provide a full representation of a counterparty's activities and decisions under its CPDs and other counterparty relationship.

Considerations for Selecting a Specific Method for Modeling Counterparty Actions Irrespective of the category of method selected from the three above, within a category a user may choose between a more simple and approximate and a more detailed and comprehensive implementation of such a method. When making such a choice a user may consider a number of factors, including the significance of the activities managed with the CPD in question, the nature of the counterparty actions being modeled, the products and/or services in question, the cost and availability of relevant information, modeling, and analysis resources, and the organizational affiliation and other characteristics of the counterparty.

For example, when the activities managed with a CPD are critical and/or uncertainty about counterparty actions under the CPD has a material impact on important operational activities and/or associated performance metrics, greater investment in more comprehensive and accurate modeling of counterparty actions will in general be desired. On the other hand, if counterparty actions are relatively simple and predictable, or if the impact of the actions is limited, simple modeling methods may be appropriate. Data availability may also be an important factor, since data limitations may preclude more comprehensive analysis. As a third example, if the counterparty is another organizational entity within the same firm, or an external party with which a close, long term relationship is maintained, an investment in more comprehensive data collection, modeling, and analysis capabilities may be justified.

In step 207 joint distributions related to the probability distributions estimated in step 206 are calculated. The distributions calculated include joint distributions among such probability distributions, and between such probability distributions and the probability distributions of the SPFEs and other relevant uncertain variables from step 202(b).

In most cases, when a probability distribution is estimated in step 206, one or more probability or joint probability distributions from step 202(b) may be utilized, as described above. In such cases the joint distributions between the probability distribution estimated in step 206 and the probability distributions from step 202(b) can be estimated based on the relationships between the uncertain variables utilized in the analysis in step 206.

All other joint probability distributions can be estimated with any of a wide range of statistical or probabilistic modeling techniques standard in the art, and consistent with the data available for the probability distributions, as identified in module 204. Further, as described in step 101(f) above, if data is available in the analysis system data storage location about the joint distributions which are and are not required by the system, this data may be utilized so that only the joint distributions which are required by the analysis system are estimated. For example, under the structure or assumptions of the analysis system certain variables may be unrelated or statistically independent.

In step 208 user reports may be generated summarizing and/or comparing the probability distributions and joint probability distributions which have been estimated. Data may be presented in graphical format, data tables, spreadsheets, or other suitable formats. A wide range of statistical and probabilistic data may be presented, including values such as the mean, variance, percentile values, extreme values, and relationships between variables, both at individual points in time or over time. Measures of error, statistical validity, and other methods of assessing the quality of the estimates may be presented, and the performance of different methods of generating such estimates may be compared for user review and selection.

In step 209 users may modify one or more of the probability or joint probability distributions which have been determined, or provide other input, for example on the method that should be used to generate one or more of the required distributions. For example, it the performance of multiple alternative methods for generating one or more of the probability distributions is shown in the reports, the user may specify the method which should be utilized. As a second example, the user may specify changes to one or more of the probability distributions based on expert judgment or other data sources, for instance recent interactions with the relevant counterparty. After suitable user review and modification, if any, finalized probability distributions and joint probability distributions are recorded in the appropriate data storage location, which may include the CPD data storage location, the probability distribution storage location, the data storage location for the analysis system described in Section C below and shown in FIG. 3, or another suitable location.

C. System and Method to Determine the Overall Management Strategy for the Operational Activities, Counterparty Relationships, and CPDs Once the probability distributions and joint probability distributions for relevant SPFEs, other sources of uncertainty, and the likely actions of counterparties under CPDs have been assessed, the best overall management strategy for the set of operational activities in question can be determined. Relevant decisions include the actions to take over the SPFE of each CPD, given available rights and obligations under the CPD, actions to take under other counterparty relationships where CPDs are not in place, and planning and execution decisions for the operational activities. In the discussion below the key considerations for each of these categories of actions are described. Following this discussion a system and method for the joint analysis and management of these categories of actions is described.

Considerations for Actions over the SPFE of Each CPD

As described above, the rights and obligations of each of the counterparties of a CPD define the sets of feasible actions for that counterparty over the SPFE of the CPD. Accordingly, to most effectively utilize its available CPDs, each counterparty must determine the best actions from these sets of feasible actions, factoring in all relevant sources of uncertainty.

To determine the actions under relevant CPDs which provide the greatest benefit to the overall management of a set of operational activities, prospective actions under relevant CPDs must be assessed in the context of the circumstances, objectives, requirements, constraints, and other alternatives for the operational activities, including counterparty relationships where CPDs are not in place. Further, since actions taken under individual CPDs will affect the overall circumstances related to the operational activities, including resources, requirements, and alternatives, actions across the set of relevant CPDs should in general be analyzed jointly. Finally, since many or all of the problem variables and parameters identified above may be uncertain, appropriate probability distributions and joint probability distributions must be utilized, as may be determined with the systems described in Sections A and B above.

For example, to determine whether it is appropriate to use flexibility which may be available under a CPD for one input to secure a larger volume of supply for that input in order to meet demand for a product built with that input, the availability of a comparable level of supply of other relevant inputs under the CPDs for those inputs and under comparable outcomes of relevant sources of uncertainty should also be assessed.

Key Considerations for Actions under other Counterparty Relationships where CPDs are not In Place, and for Planning and Executing Operational Activities Following the same logic, since the circumstances, objectives, requirements, constraints, and other alternatives for the operational activities are also affected by actions taken under other counterparty relationships where CPDs are not in place, and by planning and execution decisions for the set of operational activities, in general these decisions should also be made jointly with decisions regarding the utilization of CPDs. Key considerations for each of these categories of actions are described below.

i. Actions under other Counterparty Relationships where CPDs are not in Place

Analysis of actions under other counterparty relationships where CPDs are not in place shares certain similarities with analysis of actions under relationships where CPDs are in place. These similarities include the need to analyze the likelihood of potential future outcomes of relevant sources of uncertainty, to analyze the potential actions of counterparties across these prospective events, and determine the actions that provide the greatest benefit to the overall management of the set of operational activities. Further, analysis of the best actions to take should be done in the context of the circumstances, objectives, requirements, constraints, and other alternatives for the operational activities. Last, since actions taken under each individual counterparty relationship will affect the overall circumstances related to the operational activities, including resources, requirements, and alternatives, actions across the set of relevant counterparty relationships should in general be analyzed jointly.

The key difference relative to analysis of relationships where CPDs are in place is that in relationships where CPDs are not in place a SPFE is not defined, and counterparty rights and obligations are not defined over a SPFE. As a result, in general there is greater ambiguity about relevant potential future events, and about the actions which the counterparties to a relationship can and will take over them, making different analysis approaches appropriate. Fortunately, because relationships where CPDs are not in place are currently the norm, a wide variety of analysis approaches have been developed to evaluate and plan actions under them, including approaches from fields including management science, economics, and negotiation. Such methods are well established both for cases where the relationship is cooperative, as may be true for relationships with other organizational entities within the same firm, and where the relationship is competitive or strategic, as may be the case for relationships with external partners. In each case relevant sources of uncertainty must be incorporated. Any such method may be utilized here.

ii. Planning and Execution Decisions for the Operational Activities

The final set of decisions required is the planning and execution actions for the operational activities. For a given set of operational activities, methods for making relevant planning and execution decisions are well known. For example, if the operational activities include manufacturing, typically capacity, production, and material plans must be created and executed, while if the operational activities include procurement or sales and marketing, supply and demand plans must be determined, and counterparty relationships established and executed. In each case relevant sources of uncertainty may be incorporated.

As described above, these planning and execution decisions should be made jointly with decisions about appropriate actions to take under relationships with counterparties, including both relationships where CPDs are in place and relationships where they are not, since each set of actions impacts, and is impacted by, the circumstances, requirements, constraints, and other alternatives for the operational activities.

Since methods exist in the prior art for planning and executing operational activities jointly with the management of counterparty relationships for which CPDs are not in place, the new capability required in the present context is the ability to also incorporate analysis of actions under counterparty relationships where CPDs are in place into this joint management activity. The system and method described next provides this capability.

System and Method for Joint Determination of (1) Planning and Execution Decisions for a Set of Operational Activities, (2) Actions Over the SPFEs of Relevant CPDs, and (3) Actions Under Other Counterparty Relationships Where CPDs are not In Place FIG. 3 shows a flowchart that illustrates a method for the joint determination of (1) planning and execution decisions for a set of operational activities, (2) actions over the SPFEs of relevant CPDs, and (3) actions under other relevant counterparty relationships where CPDs are not in place.

In step 301 the probability distributions and relevant joint probability distributions for the SPFEs of relevant CPDs, and of sources of uncertainty related to the rights and obligations of the CPDs, the operational activities, or other relevant counterparty relationships where CPDs are not in place, are imported. In one instance, this data is available from the data storage location of the system described in Section A above, and shown in FIG. 1.

In step 302 probability distributions and joint probability distributions for the likely actions of the counterparties of each relevant CPD over its SPFE are imported. In one instance, this data is available from the data storage location of the system described in Section B above, and shown in FIG. 2.

In step 303 the relevant set of operational activities is represented, including available alternatives for its management and control, including planning and execution, and relevant sources of uncertainty. The specific elements of this representation will depend on the nature of the operational activities in question, but will in general include resources, capabilities, constraints, lead times, costs, relevant sources of uncertainty, and feasible actions. Methods of representing a wide range of different types of operational activities are well established in the prior art, any of which may be utilized.

In step 304 an organizational entity's rights and obligations over the SPFEs of each relevant CPD, along with products and/or services addressed, and CPD time horizons, are imported from the CPD data storage.

In step 305 both the actions which the manager of the set of operational activities may take under relationships where CPDs are not in place, and the probability distributions and joint probability distributions of the likely actions of counterparties under such relationships, are assessed. These sets of available actions, and the distributions of the likely actions of counterparties, may vary with the outcome of relevant sources of uncertainty, such as the performance risk of a supplier or partner, or the uncertain level of demand for a product or service, for which relevant probability distributions and joint probability distributions have been imported in step 301. Methods for assessing these sets of available actions, and the probability distributions and joint probability distributions for the likely actions of counterparties, are known in the prior art, as described above. Any such method may be utilized.

In step 306 objectives for the management of the operational activities are specified by the user. These may include goals for one or more performance metrics, and/or for actions or outcomes under relevant counterparty relationships, including both counterparty relationships where CPDs are in place and relationships where CPDs are not in place. All such metrics, actions, or outcomes may be defined over the outcomes of one or more relevant sources of uncertainty, including the SPFEs of relevant CPDs and sources of uncertainty associated with the operational activities, or with relationships where CPDs are not in place.

Examples of potential performance metrics include cost, capacity utilization, headcount, cycle time, liability, inventory, gross margin, revenue, and service level. Examples of performance measures, actions, or outcomes for counterparty relationships where CPDs are in place include performance to all the terms of one or more of the CPDs, performance to a subset of the terms of one or more CPDs, performance over a subset of the SPFEs of one or more CPDs, or a combination thereof. Examples of performance measures, actions, or outcomes for counterparty relationships where CPDs are not in place include lead time, service level, and on-time delivery. Examples of performance metrics, actions, or outcomes defined over outcomes of one or more relevant sources of uncertainty include the expected value, variance, worst case, percentiles, or joint distribution of such measures over one or more relevant sources of uncertainty.

To facilitate the specification of such goals, a range of templates, standard forms, or summary criteria may be established, among which users may choose. For example, templates may be established for goals such as minimize expected cost, maintain customer service level greater than or equal to the 98th percentile of the probability distribution for customer demand, or minimize worst case liability, defined as the sum of variables related to liability, such as inventory and performance obligations under CPDs and other relationships.

In step 307 data from steps 301-306 above is input into an analysis engine to determine the values of all relevant decisions which best meet the objectives specified in step 306. Relevant decisions include planning and execution decisions for the operational activities, actions under CPD rights and obligations across the SPFE of the CPD, and actions under counterparty relationships where CPDs are not in place, in each case over the joint probability distribution of relevant sources of uncertainty, including the actions of counterparties under CPDs from step 302 and actions of counterparties under relationships where CPDs are not in place from step 305, as well as sources of uncertainty associated with the operational activities and counterparty relationships. The analysis engine in step 307 also generates the values of the performance measures, actions, and outcomes specified in step 306 which result from the decisions which have been determined. The analysis engine may employ any of a range of established stochastic optimization methods.

Relative to the problem formulation of existing methods for jointly analyzing operational activities and counterparty relationships where CPDs are not in place, note that the problem formulation of the analysis engine here includes the SPFEs of relevant CPDs, the specification of CPD rights and obligations across them, the actions of counterparties under CPD rights and obligations, and sources of uncertainty and joint probability distributions related to all of the above. By utilizing the probability distributions and joint probability distributions from Steps 301 and 302, and specification of CPD rights and obligations from step 304, this expansion of the problem formulation is straightforward.

In step 308 the outputs of the analysis engine in step 307 are sent to a reporting engine, which generates reports summarizing all relevant decisions policies, and the values of relevant performance measures, actions, and outcomes. As noted in the discussion of step 306 above, both the decision policies and performance measures reported will in general be contingent on relevant sources of uncertainty, and may be reported accordingly. Reports of other relevant variables may also be generated, such as key inputs, sources of uncertainty, actions of counterparties under relationships, etc. Examples of potential performance metrics include cost, capacity utilization, headcount, cycle time, liability, inventory, gross margin, revenue, and service level. For uncertain variables, values reported may include the expected value, variance, worst case, percentiles, or the joint distribution of such measures for two or more such variables. Any manner of suitable charts, graphs, data tables, other suitable reporting formats may be used.

A sample report is shown in FIG. 4, for operational activities involving sourcing. The report shows the results of the analysis of the role and impact of three sourcing CPDs.

Referring first to the graphic at the top of the report, the lower, middle, and upper curved lines respectively show the 10th, 50th, and 90th percentiles of the probability distributions for the organizational entity's future demand for the good being sourced, for each of the future periods shown on the horizontal axis of the graphic. The shaded regions in the graphic show the corresponding quantity of the good sourced under each of the three CPDs, as determined by the analysis engine based on the rights and obligations of the CPDs.

By referring to the graphic the user may assess the impact of the portfolio of three CPDs on the organizational entity's ability to meet uncertain future requirements for the good. For example, the combined quantity of the good available under the rights of the three CPDs exceeds the 90th percentile of the probability distribution for demand in each period. Thus by reviewing the graphic the user may determine that the portfolio of three CPDs will enable the organizational entity to secure a sufficient quantity of the good to meet potential demand outcomes up to the high end of its probability distributions for future demand.

Referring next to the table in the report, numerical data is shown which summarizes the impact of the CPDs on several operational variables. For each variable, values are shown across potential outcomes for the organizational entity's future demand for the good. Specifically, each row in the table shows the values of a specific operational variable, such as material, inventory, or shortage cost, under demand outcomes in the lowest 25% of possible demand outcomes, middle 50% of possible demand outcomes, and highest 25% of possible demand outcomes, as determined using the probability distributions for such demand outcomes. To determine how CPD impact varies across different potential future demand outcomes, which is a key consideration in managing sourcing activities when demand is uncertain, a user may accordingly compare a variable's value across such demand ranges. Further, by reviewing the values of each of the different variables shown in the table, the user may assess how CPD impact varies across key impact areas. In addition, the user may identify areas for improvement, assess trade-offs in impact across different variables and demand outcomes, and conduct other similar analyses.

It should be noted that the sequence of some of the steps above may be changed without altering the functioning or results of the system and method. For example, as shown in FIG. 3, steps 302-306 all generate inputs to step 307, and do not have serial dependencies. As a result, the steps may be completed in any desired order.

The invention has been described with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

D. Systems and Methods for Using the Techniques Described Herein

The management of operational activities when CPDs are in place described herein can be implemented with a wide variety of computer systems and networks. An exemplary embodiment will be described and illustrated.

Most organizations produce, generate, and maintain documentation and all manner of communications with enterprise data systems, which are typically comprised of networked data storage computers in communication with many users at computer workstations. The users access the data and conduct communications through computers including desktop computers, laptop computers, and the like. Communications between users often occurs via email systems. The databases maintained by the computer network often include a vast amount of data such as operational data, inventory, marketing, personnel, and the like. The storage network typically operates under a storage network application, often under control of document management software.

The operations described in the description above and illustrated in the operational illustrations can be performed by users communicating over computer networks utilizing enterprise data systems relating to the operational activities and CPDs being analyzed and managed, including related sources of uncertainty. An exemplary system that performs such operations is illustrated in FIG. 5.

Figure 5:
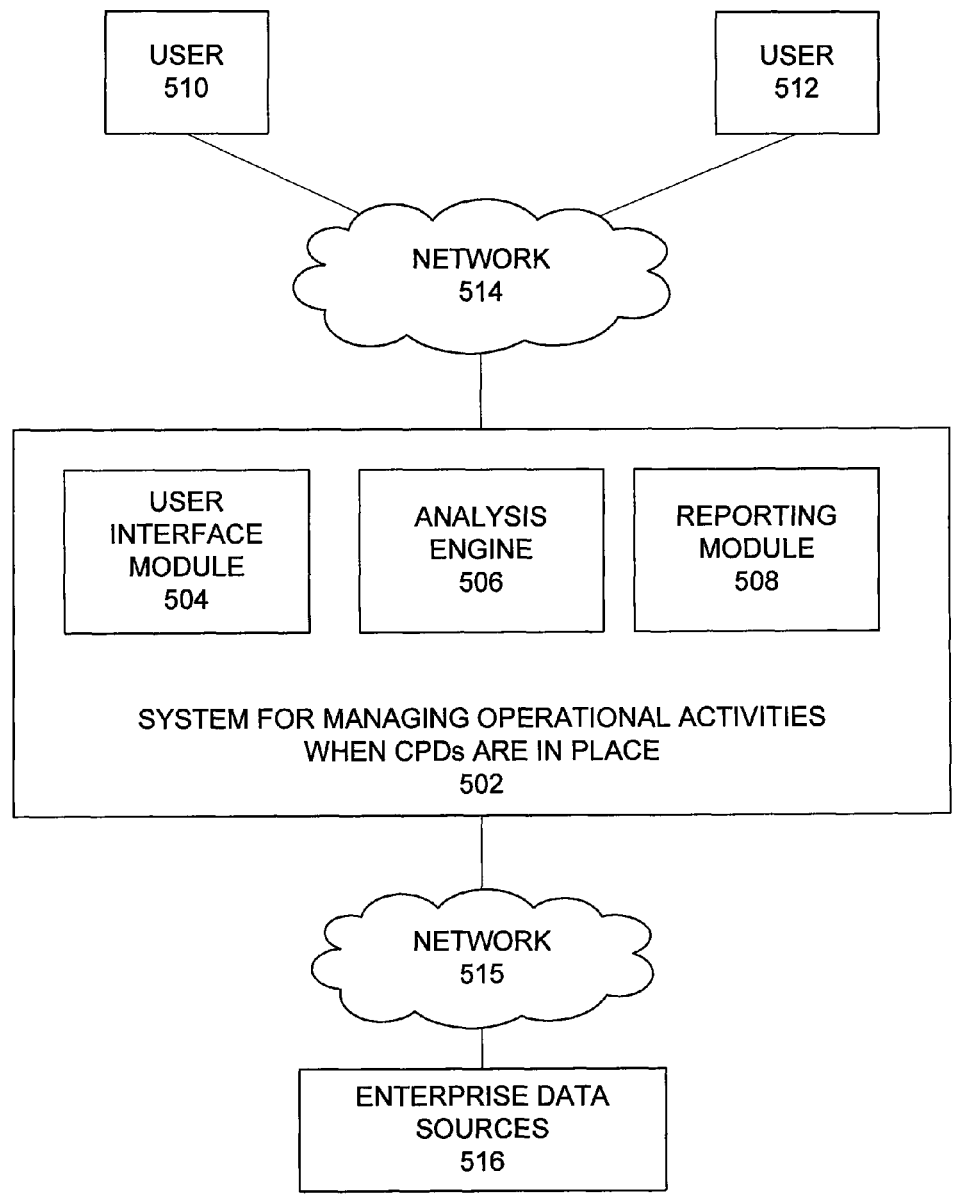
FIG. 5 is a block diagram of a system constructed in accordance with the invention to perform the operations illustrated in FIGS. 1-3 for managing operational activities when CPDs are in place.

FIG. 5 shows a System for Managing Operational Activities When CPDs are in Place 502 constructed in accordance with the present invention. The system 502 includes a user interface module 504, analysis engine 506, and reporting module 508. The user interface module supports communication with users 510, 512 over a network connection 514. The system can be implemented with processors such as conventional desktop computers, laptop computers, servers, and the like that are capable of performing the operations described herein. The users 510, 512 can communicate with the system over the network 514 or can be connected directly to the computer implementing the coordination and management system 502, such as by USB connection, wireless communication, and the like.

Although two users 510, 512 are illustrated in FIG. 5, it should be noted that each of the two users may comprise multiple individuals. That is, only two users 510, 512 are illustrated for simplicity of presentation and discussion only; the system 502 can support multiple parties and users as described above.

The user interface module 504 is the means through which the users 510, 512 can interact with the system. The information regarding operational activities, CPDs, counterparties, related sources of uncertainty, and other necessary inputs may either be entered directly by the users through the user interface module, or may be uploaded from one or more existing locations, such as from one or more databases.

For some inputs, templates or default values may be used by the system 502 to automatically generate an initial values, which may then be modified by the users. For example, a user might use the interface module 504 to select a type of operational activity, from which the system generates a standard representation of such activity, or a user might identify a type of counterparty relationship, from which the system generates a model of counterparty actions under the counterparty relationship. The user may then modify and refine such representation or model as appropriate. In this way, a manager of the system 502 may prearrange templates and default values to help users carry out the process of populating necessary data fields.

The user interface module 504 can comprise a software application that manages the user-to-user communication and facilitates analysis and management of the operational activities and CPDs. The module may facilitate such communications by providing a message forum or other means of storing, retrieving, and sharing messages between users of the system.

The module may solicit information concerning the operational activities, CPDs, counterparty relationship, sources of uncertainty, objectives, or other necessary data. That is, the module may generate messages to users that request information needed, or the module may generate on-screen queries in real time (i.e., wait for response) while a user is interacting with the system in connection with the management of operational activities. The operational activities, including counterparty relationships where CPDs are not in place, may be modeled with methods commonly used in current practice. The module 504 may also facilitate user access to other current and prospective CPDs of the organizational entities, and data about relevant sources of uncertainty and CPD counterparties.

In addition to receiving information from users, the operational modeling and related information may be automatically obtained by the user interface module 504 via data maintained by the system 502 or the module may have access to enterprise data sources 516 over a data network 518. The data network 518 can comprise the same network 514 over which the users 510, 512 communicate with the System 502, or the data network 518 can comprise a different network with access control and security as desired. The enterprise data sources 516 can comprise databases that contain the enterprise operational information needed to operate with the CPDs as described herein. Such data sources may include, for example, data applications management systems such as provided by Oracle, Inc. and SAP AG and related systems, such as enterprise resource planning, customer relations management, supplier relationship management, production, distribution, materials, and transportation planning, inventory management, master data management, and the like. The enterprise data sources 516 may include systems at a single company or organizational entity, or may include systems from multiple companies and organizational entities. The data may include a wide variety of enterprise data, such as data relating to sourcing of materials, production and distribution of productions, transportation, product design and engineering, sales and marketing operations, customers, suppliers, and partners, inventory, and human resources. Thus, the user interface module 502 may include a component for retrieving data from enterprise databases, such as from relational database management systems, and may include a component for data conversion or message processing or other processing necessary to permit operations on the retrieved data by the system 502 in accordance with this description.

Once the users 510, 512 have communicated and established all necessary data inputs for the analysis engine as described above, the analysis engine 506 determines the actions that should be taken under the operational activities, CPDs, and counterparty relationships where CPDs are not in place, in each case over relevant sources of uncertainty, including SPFEs of the CPDs. The impact of such actions on the operational activities, CPDs, and counterparty relationships, and on the values of related performance metrics, in each case over relevant sources of uncertainty, is also determined. The method for doing so is described in Section C above and shown in FIG. 3, and details of the system implementation of such method are provided in Section E below, and shown in FIG. 6.

The system 502 may provide data on the recommended actions, operational impact and performance metrics through data tables, such as spreadsheets, as well as through more visual means, such as graphs and charts. Initial results may be reviewed by one or more users, who may identify one or more inputs to the analysis engine that should be changed, or one or more outputs that do not meet objectives or constraints, including either or both recommended actions or impact of such actions on operational activities or performance metrics. Based on this data, relevant inputs to the system may be revised and the analysis engine run again utilizing the new inputs. The next-iteration version may then be shared with relevant users, which may result in further discussion and revision. Such data interaction may be facilitated or performed by the reporting module 508. After one or more such iterations, the results may be deemed acceptable. Once finalized, the recommended actions may be provided directly to relevant execution systems for implementation. For example, recommendations regarding actions regarding utilization of rights and obligations under a CPD with a supplier may be provided to a supplier relationship management system for execution, while recommended actions for operational activities involving production planning and execution may be provided to manufacturing or shop floor management applications. Data on operational impact and performance metrics may be provided to enterprise systems used in planning and in the generation of performance projections, such as enterprise resource planning and financial and operational planning and management systems.

It should be noted that the system 502 may be used to update the recommended actions, impact on operational activities, and performance metrics, in each case across relevant sources of uncertainty, so that changing situations (and/or more relevant or accurate data) may be incorporated. Such options in managing the operational activities, CPDs, and counterparty relationships may be specified through the user interface module 502, including provision of updated values of relevant inputs. Thus, the system may be used to manage the operational activities, CPDs, and counterparty relationships on an on-going basis by suitably updating relevant inputs over time, and running the analysis engine on such updated inputs.

The set of recommended actions and their impact produced by the analysis engine 506 may be provided in an interactive fashion, in real time, or the results may be communicated in a report document in addition to or in place of an interactive real-time reporting. The user interface module 504 will automatically establish communication with the analysis engine 506 and provide the data needed by the analysis engine, in the format necessary, without intervention by the users. The results produced by the analysis engine 506 are received by the reporting module 508. The reporting module produces a report according to a report format. The report format may be specified by an authorized user through the interface module 502. Interactive reporting from the reporting module may be provided via an enterprise Intranet or the like, such as a Web application or other display software that can provide output such as email messages or blog posts or Web pages to the computers operated by the respective users. The reporting module can format and deliver report documents by using a desktop publishing facility or similar publishing software to disseminate text and graphical information to the users via network communications. In this way, manual intervention and the labor associated with arranging raw data into a conventional report document using desktop publishing techniques are not needed.

Thus, a system manager may want to specify the desired report format through an authorized user via the interface module. The interface module may be used to specify availability of the report. That is, access to the report of the analysis engine results may be restricted to designated parties or users. In this way, the report might be designated for enterprise management only, or for managers responsible for specific operational activities, CPDs or counterparty relationships, or for some combination of users.

The analysis engine 506 can be used to update or monitor the impact of CPDs included in the analysis by users 510, 512. That is, the user interface module 504 can be used to add, remove, or modify one or more CPDs and the analysis engine can evaluate the impact of the addition, deletion, or modification of the one or more CPDs on recommended actions or one more performance metrics for the operational activities. The analysis engine also can evaluate the likely impact of such changes on the operational activities themselves, including actions under CPDs and counterparty relationships where CPDs are not in place. A user who retrieves or enters one or more CPDs for analysis can specify such operations through appropriate input when initiating an analysis. The analysis engine will automatically consult the appropriate local storage or enterprise data sources to perform the analysis.

As noted above, the output of the analysis engine 506 may be produced by the reporting module 508 so as to provide summary data on the recommended actions and their impact on operational activities, CPDs, or performance metrics, or to provide subsets of such data of particular relevance to individual users, such as users responsible for specific activities, CPDs, or counterparty relationships where CPDs are not in place.

Similarly, the reporting module 508 can generate reports on recommended actions and their impact under different events of, or subsets of events of, the SPFEs of one or more CPDs, or across outcomes of other relevant sources of uncertainty. Reports of this kind allow the impact of recommended actions, and of the rights and obligations of the CPDs under specific uncertain events or subsets of uncertain events to be quantified and analyzed, and therefore further better understood and managed to provide the greatest benefit.

The reporting module 508 receives the analysis engine 506 output and is adapted to produce summary reports. These reports can be configured to provide summary data on the recommended actions and their impact on operational activities, CPDs, or performance metrics, or to provide subsets of such data of particular relevance to individual users, such as users responsible for specific activities, CPDs, or counterparty relationships where CPDs are not in place. A user of the system 502 can request one or more reports and can specify the nature of data to be reported and the presentation format. The reporting module can automatically request and obtain access to data, such as enterprise data sources, necessary to produce the requested reports. The reporting module also can produce a report containing data on the inputs to the analysis for user review and comparison with results generated.

The reporting module 508 permits tailoring the reports generated to reflect the characteristics of the operational activities being assessed, and to the business purpose of the reports, including the role and sophistication of their intended audience. That is, the reporting requirements of different organizational entities will in general differ as to details, topics, metrics, and the like, due to differences in their activities and objectives, and the reporting module will provide an interface through which the parties may tailor the output. The reporting module may restrict such tailoring to users who have authorization to do so, such as through a setup operation. The report tailoring may occur at setup of an installation of the system, or the tailoring may occur based on specific operational activities or CPDs addressed, or on an analysis-by-analysis basis.

The user interface module 504, analysis engine 506, and reporting module 508 have been described above as independent components of the System for Managing Operational Activities When CPDs are in Place 502. These components, however, may be provided as separate and distinct processing units, each implemented with separate dedicated processors or computers, or the components may comprise modules of one or more software processes that execute within the operating system of a single processor or computer. Nevertheless, the functional distinctions described above for each of the modules 504, 506, 508 may be used to describe the operation and processing of the system 502.

E. Analysis Engine

Figure 6:
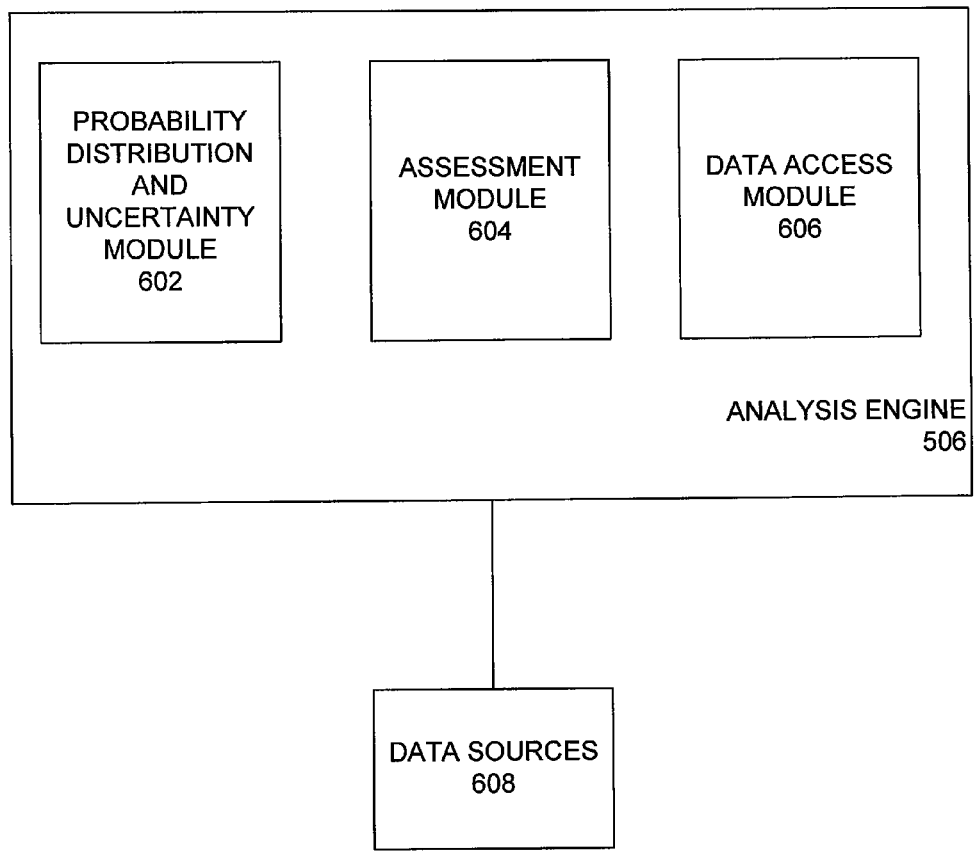
FIG. 6 is a block diagram of the analysis engine depicted in the FIG. 5 system.

FIG. 6 is a block diagram of the analysis engine 506 depicted in FIG. 5 for the System for Managing Operational Activities When CPDs are in Place 500. The analysis engine 506 of the system 500 includes a probability distribution and uncertainty module 602, an assessment module 604, a data access module 606, and a strategy module 608. As described above, the analysis engine is adapted to communicate with the operational activities and CPDs, which may be stored in data storage 610 of the system 500 or of other computer systems with which the system 500 communicates.

As noted previously with respect to FIG. 5, the analysis engine 506 uses the probability distribution and assessment module 602 to assess the probability distribution data relating to the SPFEs of the CPDs and other sources of uncertainty that are relevant to the operational activities, CPDs, and counterparty relationships where CPDs are not in place. These operations were described above in Section A in connection with FIG. 1, and also were described above in connection with FIG. 5. The System for Managing Operational Activities When CPDs are in Place 500 will facilitate identification and retrieval of information relating to SPFE probability distribution data and other uncertainty data items and corresponding sources. For example, such data can be retrieved from various currently available database management systems with which the System for Managing Operational Activities When CPDs are in Place will be adapted to interface.

After probability distribution data relating to the SPFEs of the CPDs and other sources of uncertainty that are relevant to the operational activities, CPDs, and counterparty relationships where CPDs are not in place have been obtained, the assessment module 604 of the analysis engine 506 assesses probability distributions for the likely actions of the CPD counterparties over the SPFEs of the CPDs and other relevant sources of uncertainty. Details of these operations were described above in Section B in connection with FIG. 2, and also were described above in connection with FIG. 5. As noted above, the analysis engine, through the assessment module, may retrieve data from the various data sources of the system 500, or the system may communicate with external data sources to obtain the needed data. Such access activity may be performed through the data access module 606 of the analysis engine 506, in conjunction with data communication to the data sources 608. The communication with the data sources may involve access to enterprise data sources 516 over a computer network 518 (see FIG. 5).

Once the probability distribution data relating to the SPFEs of the CPDs and other sources of uncertainty that are relevant to the operational activities, CPDs, and counterparty relationships where CPDs are not in place have been obtained, and probability distribution data for the likely actions of the CPD counterparties have been obtained, a set of recommended actions will be produced for the CPDs, operational activities, and counterparty relationships where CPDs are not in place by the analysis engine 506, in each case across outcomes of relevant sources of uncertainty. The analysis engine 506 will also determine the impact of such actions on operational activities, CPDs, counterparty relationships, and related performance metrics, in each case across relevant sources of uncertainty. Details of these operations were described above in Section C in connection with FIG. 3, and were also described above in connection with FIG. 5. Both the recommended actions and their impact across relevant sources of uncertainty may be provided to the Reporting module 508 (FIG. 5) for output presentation, as described above. Details of such operations were described above in Section C in connection with FIG. 3, and also were described above in connection with FIG. 5.

F. Features

The techniques described above can provide suitable analysis and generate appropriate output that can assist users in effectively determining appropriate actions under CPDs, operational activities, and counterparty relationships where CPDs are not in place, and assessing the impact of such actions on operational activities, CPDs, counterparty relationships, and related performance metrics, in all cases across relevant sources of uncertainty. These techniques provide a variety of features, some of which are listed below.

1. Method for managing the operational activities of an organizational entity within a firm which has CPDs in place with one or more other organizational entities within the same firm, and which may also have CPDs in place with external parties.
2. Method for managing the operational activities of an organizational entity which has CPDs in place for one or more inputs and for one or more outputs.
3. Method of features 1 or 2 where the probability distribution of the SPFE of one or more CPDs is assessed.
4. Method of features 1 or 2 where the joint probability distribution of the SPFEs of two or more CPDs is assessed.
5. Method of features 1 or 2 where the joint probability distribution of one or more SPFEs of one or more CPDs and one or more other sources of uncertainty relevant to the organizational entity are assessed, where the later may include sources of uncertainty related to the operational activities of the organizational entity, or to its counterparty relationships.
6. Method of features 1 or 2 where the probability distributions of the actions of one or more counterparties of one or more CPDs are assessed over one or more events from the SPFEs of the one or more CPDs
7. Method of feature 6 where the joint distribution between the probability distributions for the actions of the CPD counterparty over the SPFE of the CPD and probability distributions for one or more sources of uncertainty related to the operational activities of the organizational entity, or to its counterparty relationships, are assessed.
8. Method of features 1 or 2 where the actions that should be taken under one or more CPDs over relevant sources of uncertainty are assessed based on one or more objectives for or constraints on the operational activities specified over relevant sources of uncertainty
9. Method of features 1 or 2 where the actions that should be taken under one or more CPDs are jointly assessed with other potential actions of the organizational entity, including planning and execution decisions for operational activities of the organizational entity and actions under counterparty relationships where CPDs are not in place, based on one or more objectives or constraints for the operational activities over relevant sources of uncertainty.
10. Method of features 8 or 9 where the impact of the recommended actions on the operational activities, CPDs, counterparty relationships where CPDs are not in place, and related performance metrics, in each case over relevant sources of uncertainty, are assessed.

The present invention has been described above in terms of presently preferred embodiments so that an understanding of the present invention can be conveyed. There are, however, many configurations for management systems not specifically described herein but with which the present invention is applicable. The present invention should therefore not be seen as limited to the particular embodiments described herein, but rather, it should be understood that the present invention has wide applicability with respect to management systems generally. All modifications, variations, or equivalent arrangements and implementations that are within the scope of the attached claims should therefore be considered within the scope of the invention.

I claim:

1. A computer method for performing analysis of operational activities with respect to uncertainty data, the method comprising:

associating, by a computer processing device, numerical values with respect to operational activities;

defining, by the computer processing device, that the associated numerical values comprises a set of rights and obligations for each of two or more parties to a CPD with respect to the operational activities;

establishing, by the computer processing device, a data set comprising uncertain potential future events (SPFE) of the CPD;

linking, by the computer processing device, the associated numerical values to the created data set;

creating, by the computer processing device, a data record that comprises a contingent performance deliverable (CPD) having data specifying two or more parties to the CPD and the associated numerical values;

storing, by the computer processing device, one or more created data records in the computer processing device;

calculating, by the computer processing device, probability distribution function (PDF) data based on the created data records;

generating, by the computer processing device, data based on the calculated PDF data, wherein the generated data comprises a set of values;

recommending, by the computer processing device, actions to the operational activities from the set of values comprised in the generated data, wherein the recommended actions includes actions of at least one of the parties to the CPDs under the specified rights and obligations of the CPDs over the SPFEs of the CPDs;

associating, by the computer processing device, the set of values of the generated data to data that specifies one or more sources of uncertainty related to the operational activities of the at least one organizational entity, or to a party to one or more of the CPDs;

producing, by the computer processing device, a set of values based on the generated data that specify the recommended actions; and indicating, by the computer processing device, results of implementing the recommended actions on the operational activities of at least one party to the CPD from the produced set of values.

2. A computer method as in claim 1, wherein the generated set of values, that specify recommended actions relating two or more of the parties to one or more of the CPDs, comprise data identifying organizational entities who are members of respective enterprises such that the respective enterprises are the same enterprise.

3. A computer method as in claim 1, wherein the generated set of values, that specify the recommended actions for relating the operational activities of the at least one organizational entity, comprise data that determines subsets of the operational activities of one or more such organizational entities.

4. A computer method as in claim 1, wherein the generated data comprising the set of values that indicates results of implementing the recommended actions includes data that determines actions for an organizational entity under at least one of its rights and obligations under a CPD, operational activities, or counterparty relationships where CPDs are not in place.

5. A computer method as in claim 1, wherein the generated data comprising the set of values that indicates results of implementing the recommended actions determines specification of objectives for such result.

6. A computer method as in claim 1, wherein the generated data comprising the set of values that indicates results of implementing the recommended actions includes data values for one or more performance metrics.

7. A computer method as in claim 1, wherein calculating PDF data includes utilizing probability values for one or more variables related to at least one of the operational activities, CPD rights and obligations, CPD SPFEs, or parties to the CPDs, where such probability values include joint probability distributions between such variables.

8. A computer method as in claim 1, wherein the generated set of recommended actions for relating the operational activities of the at least one organizational entity includes relationships with other parties where CPDs are not in place.

9. A computer method as in claim 1, wherein the generated data comprising the set of values that indicates results of implementing the recommended actions includes data comprising an estimation of actions of parties to CPDs under the party's CPD rights and obligations, where such parties are not the at least one organizational entity.

10. A computer method as in claim 9, wherein estimation of actions includes calculation of probability values for such actions, and where such probability values may include joint probability distributions between such variables and SPFEs and other sources of uncertainty related to the operational activities, or to a party to a CPD.

11. A computer method as in claim 1, wherein the computer processing device produces a report on the likely result, or on one or more inputs used in the determination of likely result.

12. A computer method as in claim 11, wherein the report includes values defined over variables subject to uncertainty, including events from a SPFE of a CPD, or variables subject to uncertainty that are related to the operational activities of the at least one organizational entity, or to a party to one or more of the CPDs.

13. A computer method as in claim 1, wherein calculating PDF data comprises:
identifying variables subject to uncertainty and used to define events in the SPFEs, the rights and obligations under the CPDs, or related to the operational activities or to counterparty relationships related to the operational activities;
accessing data about the identified variables;
calculating probability values for identified variables in accordance with the accessed data.

14. A computer method as in claim 13, wherein calculating PDF data includes calculating the joint probability distribution for one or more of the variables.

15. A computer method as in claim 13, wherein probability values for the events in the SPFE of one or more CPDs are calculated in the computer processing device using the probabilities values for the variables.

16. A computer method as in claim 13, wherein the computer processing device screens the identified variables subject to uncertainty for at least one of level of uncertainty, impact on the operational activities, business information, or user preferences, and variables that do not pass one or more such screens are eliminated from the analysis.

17. A computer method as in claim 13, wherein the computer processing device selects a method for calculating one or more probability values based on comparison of the performance of alternative methods for calculating such probability values.

18. A computer method as in claim 13, wherein the computer processing device modifies one or more of the calculated probability values based on user input or specified criteria.

19. A computer method as in claim 13, wherein the computer processing device imports probability values for one or more of the identified variables from an external data source.

20. A computer method as in claim 13, wherein the computer processing device imports time horizon data such that the time horizon data is defined over probability values for one or more of the identified variables.

21. A computer method as in claim 13, wherein the computer processing device imports information about identified variables for which joint distributions are not required from an external data source.

22. A computer method as in claim 1, wherein calculating PDF data comprises:
identifying CPD rights and obligations under which counterparty actions are uncertain;
identifying variables related to the identified CPD rights and obligations and to uncertain counterparty actions under them;
accessing data about the identified variables;
calculating probability values for the uncertain counterparty actions in accordance with the accessed data.

23. A computer method as in claim 22, wherein the computer processing device imports probability values for one or more of the SPFEs for the CPD rights and obligations from an external data source.

24. A computer method as in claim 22, wherein the computer processing device imports probability values for one or more of the identified variables from an external data source.

25. A computer method as in claim 22, wherein the computer processing device excludes one or more identified rights and obligations from the analysis based on probability values of identified variables, business information, or user preferences.

26. A computer method as in claim 22, wherein the computer processing device categorizes the CPD rights and obligations for analysis based on at least one of CPD counterparty, operational activities addressed, business information, or user preferences.

27. A computer method as in claim 22, wherein the computer processing device selects the method used to calculate probability values for one or more uncertain counterparty actions based on at least one of business information, user preferences, or the nature and extent of available information about the identified variables.

28. A computer method as in claim 22, wherein the computer processing device calculates the joint probability distribution between one or more of the uncertain counterparty actions and one or more of the identified variables based on the data accessed.

29. A computer method as in claim 22, wherein the computer processing device modifies one or more of the probability values calculated based on user input or specified criteria.

30. A computer method as in claim 22, wherein the computer processing device selects the method for calculating one or more probability values based on the performance of alternative methods for calculating such probability values.

31. A computer method as in claim 22, wherein the computer processing device generates one or more user reports based on the results of the analysis.

32. A computer system comprising:
a processor;
instructions stored on a non-transitory computer readable medium, when executed by the processor, causes the processor to perform the operations of:
associating, by a computer processing device, numerical values with respect to operational activities;
defining, by the computer processing device, that the associated numerical values comprises a set of rights and obligations for each of two or more parties to a CPD with respect to the operational activities;
establishing, by the computer processing device, a data set comprising uncertain potential future events (SPFE) of the CPD;
linking, by the computer processing device, the associated numerical values to the created data set;
creating, by the computer processing device, a data record which comprises a contingent performance deliverable (CPD) having data specifying two or more parties to the CPD and the associated numerical values;
storing, by the computer processing device, one or more created data records in the computer processing device;
calculating, by the computer processing device, probability distribution function (PDF) data based on the created data records;
generating, by the computer processing device, data based on the calculated PDF data, wherein the generated data comprises a set of values;
recommending, by the computer processing device, actions to the operational activities from the set of values comprised in the generated data, wherein the recommended actions includes actions of at least one of the parties to the CPDs under the specified rights and obligations of the CPDs over the SPFEs of the CPDs;
associating, by the computer processing device, the set of values of the generated data to data that specifies one or more sources of uncertainty related to the operational activities of the at least one organizational entity, or to a party to one or more of the CPDs;
producing, by the computer processing device, a set of values based on the generated data that specify the recommended actions; and
indicating, by the computer processing device, results of implementing the recommended actions on the operational activities of at least one party to the CPD from the produced set of values.

33. A computer system as in claim 32, wherein the data generated by the analysis engine of a set of values that specify recommended actions relating to two or more of the parties to one or more of the CPDs comprise data identifying organizational entities who are members of respective enterprises such that the respective enterprises are the same enterprise.

34. A computer system as in claim 32, wherein the set of values produced by the analysis engine that specifies the recommended actions for relating the operational activities of the at least one organizational entity comprise data that determines subsets of the operational activities of one or more such organizational entities.

35. A computer system as in claim 32, wherein the generated data comprising the set of values that indicates results of implementing the recommended actions includes data that determines actions for an organizational entity under at least one of its rights and obligations under a CPD, operational activities, or counterparty relationships where CPDs are not in place.

36. A computer system as in claim 32, wherein the generated data comprising the set of values that indicates results of implementing the recommended actions determines specification of objectives for such likely result.

37. A computer system as in claim 32, wherein the generated data comprising the set of values that indicates results of implementing the recommended actions includes data values for one or more performance metrics.

38. A computer system as in claim 32, wherein the analysis engine utilizes probability values for one or more variables related to at least one of the operational activities, CPD rights and obligations, CPD SPFEs, or parties to the CPDs, where such probability values include joint probability distributions between such variables.

39. A computer system as in claim 32, wherein the operational activities of the at least one organizational entity include relationships with other parties where CPDs are not in place.

40. A computer system as in claim 32, wherein the generated data comprising the set of values that indicates results of implementing the recommended actions includes data comprising an estimation of actions of parties to CPDs under the party's CPD rights and obligations, where such parties are not the at least one organizational entity.

41. A computer system as in claim 40, wherein the estimation of actions includes calculation of probability values for such actions, and where such probability values may include joint probability distributions between such variables and SPFEs and other sources of uncertainty related to the operational activities, or to a party to a CPD.

42. A computer system as in claim 32, wherein the analysis engine produces a report on the likely result, or on one or more inputs used in the determination of likely result.

43. A computer system as in claim 42, wherein the report includes values over variables that are subject to uncertainty, including events from a SPFE of a CPD, or variables subject to uncertainty that are related to the operational activities of the at least one organizational entity, or to a party to one or more of the CPDs.

44. A computer system as in claim 32, wherein the analysis engine calculates the PDF data by performing operations that comprise:
identifying variables subject to uncertainty and used to define events in the SPFEs, the rights and obligations under the CPDs, or related to the operational activities or to counterparty relationships related to the operational activities;
accessing data about the identified variables;
calculating probability values for identified variables in accordance with the accessed data.

45. A computer system as in claim 44, wherein the analysis engine calculates probability values by calculating the joint probability distribution for one or more of the variables.

46. A computer system as in claim 44, wherein the analysis engine calculates probability values for the events in the SPFE of one or more CPDs using the probabilities values for the variables.

47. A computer system as in claim 44, wherein the analysis engine screens the identified variables subject to uncertainty for at least one of level of uncertainty, impact on the operational activities, business information, or user preferences, and variables that do not pass one or more such screens are eliminated from the analysis.

48. A computer system as in claim 44, wherein the analysis engine selects a method for calculating one or more probability values based on comparison of the performance of alternative methods for calculating such probability values.

49. A computer system as in claim 44, wherein the analysis engine modifies one or more of the calculated probability values based on user input or specified criteria.

50. A computer system as in claim 44, wherein the analysis engine imports probability values for one or more of the identified variables from an external data source.

51. A computer system as in claim 44, wherein the analysis engine imports time horizon data such that the time horizon data is defined over probability values for one or more of the identified variables.

52. A computer system as in claim 44, wherein the analysis engine imports information about identified variables for which joint distributions are not required from an external data source.

53. A computer system as in claim 44, wherein the analysis engine calculates the PDF data by performing operations that comprise:
    identifying CPD rights and obligations under which counterparty actions are uncertain;
    identifying variables related to the identified CPD rights and obligations and to uncertain counterparty actions under them;
    accessing data about the identified variables;
    calculating probability values for the uncertain counterparty actions in accordance with the accessed data.

54. A computer system as in claim 53, wherein the analysis engine imports probability values for one or more of the SPFEs for the CPD rights and obligations from an external data source.

55. A computer system as in claim 53, wherein the analysis engine imports probability values for one or more of the identified variables from an external data source.

56. A computer system as in claim 53, wherein the analysis engine excludes one or more identified rights and obligations from the analysis based on at least one of probability values of identified variables, business information, or user preferences.

57. A computer system as in claim 53, wherein the analysis engine categorizes rights and obligations for analysis based on at least one of CPD counterparty, operational activities addressed, business information, or user preferences.

58. A computer system as in claim 53, wherein the analysis engine selects the method used to calculate probability values for one or more uncertain counterparty actions based on at least one of business information, user preferences, or the nature and extent of available information about the identified variables.

59. A computer system as in claim 53, wherein the analysis engine calculates the joint probability distribution between one or more of the uncertain counterparty actions and one or more of the identified variables based on the data accessed.

60. A computer system as in claim 53, wherein the analysis engine modifies one or more of the probability values calculated based on user input or specified criteria.

61. A computer system as in claim 53, wherein the analysis engine selects the method for calculating one or more probability values based on the performance of alternative methods for calculating such probability values.

62. A computer system as in claim 53, wherein the analysis engine generates one or more user reports based on the results of the analysis.

63. A computer method as in claim 1, wherein the operational activities are defined by data of the CPD such that at least a first set of the set of rights for a first one of the parties to the CPD defines an operational activity that the first one of the parties may request from at least one of the remaining parties to the CPD, and at least a first set of the set of obligations for the first one of the parties defines an operational activity that the first one of the parties may be called upon to deliver to at least one of the remaining parties to the CPD.

64. A computer system as in claim 32, wherein the operational activities are defined by data of the CPD used by the analysis engine such that at least a first set of the set of rights for a first one of the parties to the CPD defines an operational activity that the first one of the parties may request from at least one of the remaining parties to the CPD, and at least a first set of the set of obligations for the first one of the parties defines an operational activity that the first one of the parties may be called upon to deliver to at least one of the remaining parties to the CPD.

65. A non-transitory computer readable medium containing instructions that, when executed by a processor, causes the processor to perform the operations of:
    associating, by a computer processing device, numerical values with respect to operational activities;
    defining, by the computer processing device, that the associated numerical values comprises a set of rights and obligations for each of two or more parties to a CPD with respect to the operational activities;
    establishing, by the computer processing device, a data set comprising uncertain potential future events (SPFE) of the CPD;
    linking, by the computer processing device, the associated numerical values to the created data set;
    creating, by the computer processing device, a data record which comprises a contingent performance deliverable (CPD) having data specifying two or more parties to the CPD and the associated numerical values;
    storing, by the computer processing device, one or more created data records in the computer processing device;
    calculating, by the computer processing device, probability distribution function (PDF) data based on the created data records;
    generating, by the computer processing device, data based on the calculated PDF data, wherein the generated data comprises a set of values;
    recommending, by the computer processing device, actions to the operational activities from the set of values comprised in the generated data, wherein the recommended actions includes actions of at least one of the parties to the CPDs under the specified rights and obligations of the CPDs over the SPFEs of the CPDs;
    associating, by the computer processing device, the set of values of the generated data to data that specifies one or more sources of uncertainty related to the operational activities of the at least one organizational entity, or to a party to one or more of the CPDs;
    producing by the computer processing device, a set of values based on the generated data that specify the recommended actions; and indicating, by the computer processing device, results of implementing the recommended actions on the operational activities of at least one party to the CPD from the produced set of values.

66. A method as in claim 1, further comprising:
receiving user input specifying objectives for the result of the recommended activities, wherein the generated values satisfy the specified objectives.

67. A computer system as in claim 32, wherein the generated values satisfy objectives specified by user input specifying objectives for the result of the recommended activities.

* * * * *